US012672080B2

(12) United States Patent
Babaei

(10) Patent No.: US 12,672,080 B2
(45) Date of Patent: Jun. 30, 2026

(54) PROPAGATION DELAY COMPENSATION FOR TIME SENSITIVE NETWORKING

(71) Applicant: TOYOTA JIDOSHA KABUSHIKI KAISHA, Toyota (JP)

(72) Inventor: Alireza Babaei, Fairfax, VA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 398 days.

(21) Appl. No.: 18/029,552

(22) PCT Filed: Oct. 21, 2021

(86) PCT No.: PCT/JP2021/039011
§ 371 (c)(1),
(2) Date: Mar. 30, 2023

(87) PCT Pub. No.: WO2022/085772
PCT Pub. Date: Apr. 28, 2022

(65) Prior Publication Data
US 2023/0413204 A1     Dec. 21, 2023

Related U.S. Application Data

(60) Provisional application No. 63/104,513, filed on Oct. 22, 2020.

(51) Int. Cl.
H04W 56/00 (2009.01)

(52) U.S. Cl.
CPC ............................... H04W 56/0045 (2013.01)

(58) Field of Classification Search
None
See application file for complete search history.

(56) References Cited

U.S. PATENT DOCUMENTS

2019/0141697 A1* 5/2019 Islam ................ H04W 56/0045
2019/0342845 A1* 11/2019 Laselva ................ H04L 1/1812
(Continued)

FOREIGN PATENT DOCUMENTS

WO     WO-2012042736 A1 * 4/2012 ........ H04W 56/0045
WO     WO 2020/079760 A1     4/2020
(Continued)

OTHER PUBLICATIONS

Oppo, "Consideration on Propagation Delay Compensation for TSC", dated Feb. 18, 2020, 4 pages.
(Continued)

*Primary Examiner* — Wutchung Chu
*Assistant Examiner* — Berhanu D Belete
(74) *Attorney, Agent, or Firm* — Finnegan, Henderson, Farabow, Garrett and Dunner, LLP

(57) ABSTRACT

A system, method and apparatus for mobile communications including time sensitive communications is provided. A user equipment (UE) receives a medium access control (MAC) control element comprising a value for calculating a propagation delay (PD) compensation. The UE determines a first timing advance (TA) based on matching a value associated with the first TA with one or more first defined values. The UE determines a PD compensation based on the value. The UE performs a timing synchronization based on the PD compensation and determines an uplink timing based on the first TA. The UE then transmits at least one of an uplink signal or an uplink channel based on the determined timing synchronization and the determined uplink timing.

10 Claims, 21 Drawing Sheets

(56) References Cited

U.S. PATENT DOCUMENTS

| 2020/0029293 | A1 * | 1/2020 | Zhang | H04W 56/0005 |
| 2020/0128539 | A1 * | 4/2020 | Abedini | H04W 56/0045 |
| 2020/0259896 | A1 | 8/2020 | Sachs et al. | |
| 2020/0322908 | A1 | 10/2020 | Prakash et al. | |
| 2021/0105761 | A1 * | 4/2021 | Cheng | H04L 5/0053 |
| 2021/0392601 | A1 * | 12/2021 | Takeda | H04W 74/006 |
| 2022/0039045 | A1 * | 2/2022 | Sun | H04W 56/0045 |
| 2022/0361128 | A1 * | 11/2022 | Singh | H04L 5/0051 |

FOREIGN PATENT DOCUMENTS

| WO | WO-2020090095 | A1 * | 5/2020 | H04W 56/00 |
| WO | WO 2020/167013 | A1 | 8/2020 | |
| WO | WO-2021033114 | A1 * | 2/2021 | H04W 56/0015 |
| WO | WO-2021255117 | A1 * | 12/2021 | H04B 7/022 |

OTHER PUBLICATIONS

ZTE Corporation et al., "Enhancements for Time Synchronization in TSN", dated Aug. 7, 2020, 10 pages.
3rd Generation Partnership Project, "3GPP TS 38.321 V16.5.0", dated Jun. 2021 (including Section 5.2 and 6.1.3.4), pp. 1-157.

* cited by examiner

| Transport channel / Logical channel | BCH | PCH | DL-SCH |
|---|---|---|---|
| BCCH | X | | X |
| PCCH | | X | |
| CCCH | | | X |
| DCCH | | | X |
| DTCH | | | X |

FIG. 3A

| Transport channel / Logical channel | UL-SCH | RACH |
|---|---|---|
| CCCH | X | |
| DCCH | X | |
| DTCH | X | |

FIG. 3B

| Transport channel / Logical channel | SL-BCH | SL-SCH |
|---|---|---|
| SBCCH | X | |
| SCCH | | X |
| STCH | | X |

FIG. 3C

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

Determine PD compensation based on TA command and PD MAC CE value

TA Command

TA Command MAC CE field value

PD MAC CE field

FIG. 20

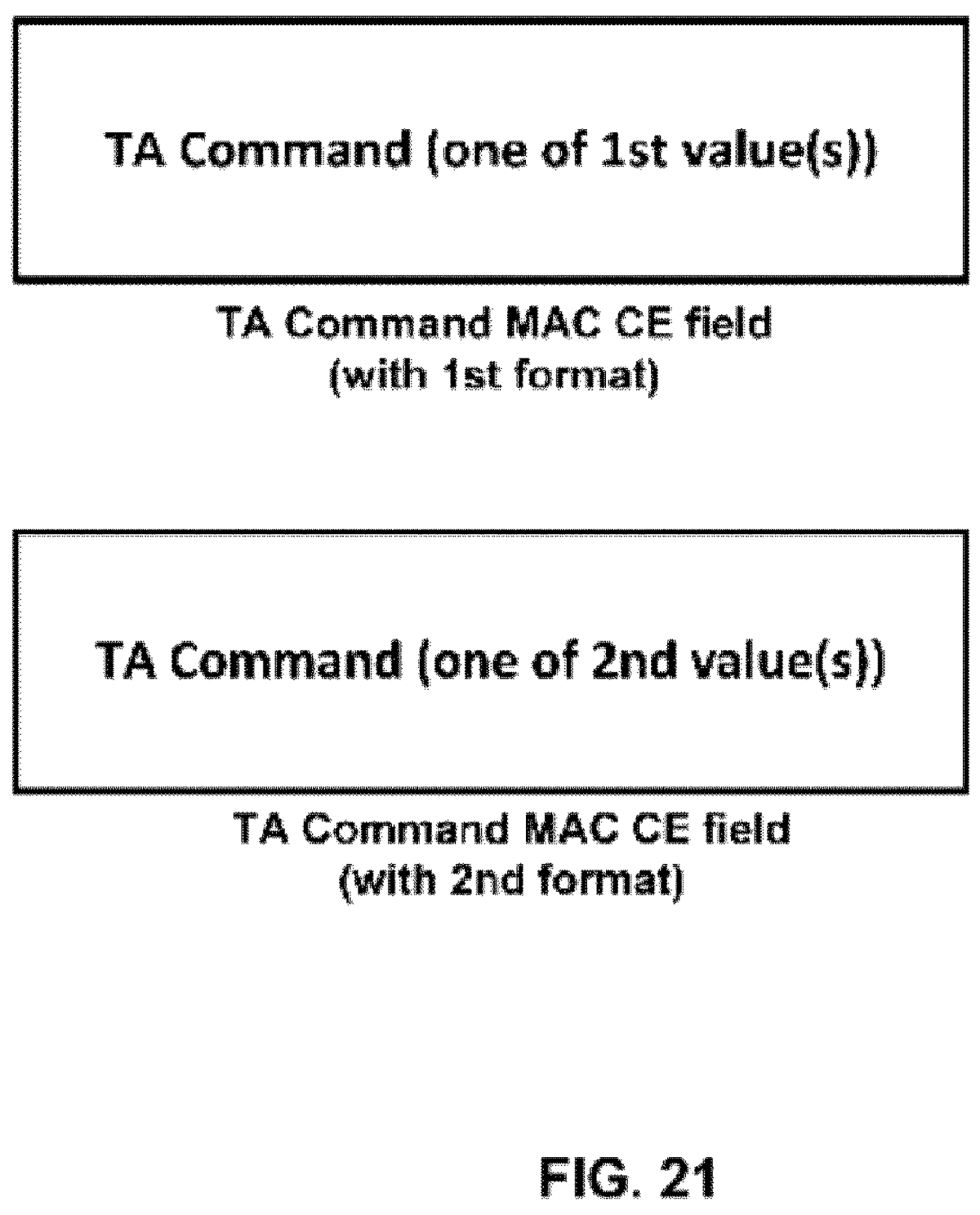

TA Command (one of 1st value(s))

TA Command MAC CE field
(with 1st format)

TA Command (one of 2nd value(s))

TA Command MAC CE field
(with 2nd format)

FIG. 21

PROPAGATION DELAY COMPENSATION FOR TIME SENSITIVE NETWORKING

CROSS-REFERENCE TO RELATED APPLICATIONS

This application is a national stage of International Application No. PCT/JP2021/039011, filed Oct. 21, 2021, and is based upon and claims the benefit of priority from U.S. Patent Application No. 63/104,513 filed Oct. 22, 2020, the entire contents of which are incorporated herein by reference.

TECHNICAL FIELD

The disclosure relates to a method of time sensitive networking (TSN) communications, and a method of wireless communications.

BACKGROUND ART

Generally described, computing devices and communication networks can be utilized to exchange information. In a common application, a computing device can request/transmit data with another computing device via the communication network. More specifically, computing devices may utilize a wireless communication network to exchange information or establish communication channels.

Wireless communication networks can include a wide variety of devices that include or access components to access a wireless communication network. Such devices can utilize the wireless communication network to facilitate interactions with other devices that can access the wireless communication network or to facilitate interaction, through the wireless communication network, with devices utilizing other communication networks.

SUMMARY OF INVENTION

In some embodiments of this disclosure, a method for time sensitive networking (TSN) communications is provided. The method includes: receiving, by a user equipment (UE), a medium access control (MAC) control element comprising a value for calculating a propagation delay (PD) compensation; determining a first timing advance (TA) in response to the value being one of one or more first values; determining a PD compensation based on the value; performing a timing synchronization based on the PD compensation; determining an uplink timing based on the first TA; and transmitting an uplink signal or an uplink channel based on the timing synchronization and the uplink timing.

In some embodiments of this disclosure, a method for time sensitive networking (TSN) communications is provided. The method includes: receiving, by a user equipment (UE), a timing advance (TA) command medium access control (MAC) control element (CE) comprising a TA command; receiving, by the UE, a signaling message comprising a first value associated with a propagation delay (PD); determining a PD compensation based on the TA command and the first value associated with the PD; performing a timing synchronization based on the PD compensation; determining an uplink timing based on the TA command; and transmitting an uplink signal or an uplink channel based on the timing synchronization and the uplink timing.

In some embodiments of this disclosure, a method for wireless communications is provided. The method includes:

receiving, by a user equipment (UE), a timing advance (TA) command medium access control (MAC) control element (CE) with a first format or a second format, wherein: the TA command MAC CE comprises a TA command, and the TA command MAC CE is formed with: the first format when the TA command has one or more first values, or the second format when the TA command has one or more second values; and determining a PD compensation based on the one or more first values or the one or more second values.

In some embodiments of this disclosure, a user equipment (UE) for a mobile communication network is provided. The UE includes: a memory storing instructions; and a processor configured to execute the instructions to: receive a medium access control (MAC) control element (CE) comprising a value for calculating a propagation delay (PD) compensation; determine a first timing advance (TA) in response to the value being one of one or more first values; determine a PD compensation based on the value; perform a timing synchronization based on the PD compensation; determine an uplink timing based on the first TA; and transmit an uplink signal or an uplink channel based on the timing synchronization and the uplink timing.

In some embodiments of this disclosure, a user equipment (UE) for a mobile communication network is provided. The UE includes: a memory storing instructions; and a processor configured to execute the instructions to: receive a timing advance (TA) command medium access control (MAC) control element (CE) comprising a TA command; receive a signaling message comprising a first value associated with a propagation delay (PD); determine a PD compensation based on the TA command and the first value associated with the PD; perform a timing synchronization based on the PD compensation; determine an uplink timing based on the TA command; and transmit an uplink signal or an uplink channel based on the timing synchronization and the uplink timing.

In some embodiments of this disclosure, a user equipment (UE) for a mobile communication network is provided. The UE includes: a memory storing instructions; and a processor configured to execute the instructions to: receive a timing advance (TA) command medium access control (MAC) control element (CE) with a first format or a second format, wherein: the TA command MAC CE comprises a TA command, and the TA command MAC CE is formed with: the first format when the TA command has one or more first values, or the second format when the TA command has one or more second values; determine a PD compensation based on the one or more first values or the one or more second values.

In some embodiments of this disclosure, a base station for a mobile communication system is provided. The base station includes: a memory storing instructions; and a processor configured to execute the instructions to: transmit, to a user equipment (UE), a medium access control (MAC) control element (CE) comprising a value for calculating a propagation delay (PD) compensation; wherein the UE is configured to determine a first timing advance (TA) in response to the value being one of one or more first values, determine a PD compensation based on the value, perform a timing synchronization based on the PD compensation, determine an uplink timing based on the first TA, and transmit an uplink signal or an uplink channel based on the timing synchronization and the uplink timing. The processor of the base station may be configured to execute the instructions to perform a PD estimation and a PD pre-compensation.

In some embodiments of this disclosure, a base station for a mobile communication system is provided. The base station includes: a memory storing instructions; and a processor configured to execute the instructions to: transmit, to a user equipment (UE), a timing advance (TA) command medium access control (MAC) control element (CE) comprising a TA command; and transmit, to the UE, a signaling message comprising a first value associated with a propagation delay (PD); wherein the UE is configured to determine a PD compensation based on the TA command and the first value associated with the PD, perform a timing synchronization based on the PD compensation, determine an uplink timing based on the TA command, and transmit an uplink signal or an uplink channel based on the timing synchronization and the uplink timing.

In some embodiments of this disclosure, a base station for a mobile communication system is provided. The base station includes: a memory storing instructions; and a processor configured to execute the instructions to: transmit, to a user equipment (UE), a timing advance (TA) command medium access control (MAC) control element (CE) with a first format or a second format, wherein: the TA command MAC CE comprises a TA command, and the TA command MAC CE is formed with: the first format when the TA command has one or more first values, or the second format when the TA command has one or more second values, and wherein the UE is configured to determine a PD compensation based on the one or more first values or the one or more second values.

In some embodiments of this disclosure, a system for mobile communication is provided. The system includes a base station configured to transmit a medium access control (MAC) control element (CE) comprising a value for calculating a propagation delay (PD) compensation. The system further includes a user equipment (UE) configured to: receive the MAC CE; determine a first timing advance (TA) in response to the value being one of one or more first values; determine a PD compensation based on the value; perform a timing synchronization based on the PD compensation; determine an uplink timing based on the first TA; and transmit an uplink signal or an uplink channel based on the timing synchronization and the uplink timing.

In some embodiments of this disclosure, a system for mobile communication is provided. The system includes a base station configured to: transmit a timing advance (TA) command medium access control (MAC) control element (CE) comprising a TA command; and transmit a signaling message comprising a first value associated with a propagation delay (PD). The system further includes a user equipment (UE) configured to: receive the TA command MAC CE and the signaling message; determine a PD compensation based on the TA command and the first value associated with the PD; perform a timing synchronization based on the PD compensation; determine an uplink timing based on the TA command; and transmit an uplink signal or an uplink channel based on the timing synchronization and the uplink timing.

In some embodiments of this disclosure, a system for mobile communication is provided. The system includes a base station configured to transmit a timing advance (TA) command medium access control (MAC) control element (CE) with a first format or a second format, wherein: the TA command MAC CE comprises a TA command, and the TA command MAC CE is formed with: the first format when the TA command has one or more first values, or the second format when the TA command has one or more second values. The system further includes a user equipment (UE)

configured to determine a PD compensation based on the one or more first values or the one or more second values.

In some embodiments of this disclosure, a non-transitory computer readable medium is provided. The non-transitory computer readable medium stores a set of instructions that is executable by at least one processor of a user equipment (UE) in a mobile communication system to perform a method. The method includes: receiving a medium access control (MAC) control element (CE) comprising a value for calculating a propagation delay (PD) compensation; determining a first timing advance (TA) in response to the value being one of one or more first values; determining a PD compensation based on the value; performing a timing synchronization based on the PD compensation; determining an uplink timing based on the first TA; and transmitting an uplink signal or an uplink channel based on the timing synchronization and the uplink timing.

In some embodiments of this disclosure, a non-transitory computer readable medium is provided. The non-transitory computer readable medium stores a set of instructions that is executable by at least one processor of a user equipment (UE) in a mobile communication system to perform a method. The method includes: receiving a timing advance (TA) command medium access control (MAC) control element (CE) comprising a TA command; receiving, by the UE, a signaling message comprising a first value associated with a propagation delay (PD); determining a PD compensation based on the TA command and the first value associated with the PD; performing a timing synchronization based on the PD compensation; determining an uplink timing based on the TA command; and transmitting an uplink signal or an uplink channel based on the timing synchronization and the uplink timing.

In some embodiments of this disclosure, a non-transitory computer readable medium is provided. The non-transitory computer readable medium stores a set of instructions that is executable by at least one processor of a user equipment (UE) in a mobile communication system to perform a method. The method includes: receiving, by a user equipment (UE), a timing advance (TA) command medium access control (MAC) control element (CE) with a first format or a second format, wherein: the TA command MAC CE comprises a TA command, and the TA command MAC CE is formed with: the first format when the TA command has one or more first values, or the second format when the TA command has one or more second values; determining an uplink timing based on the TA command; and transmitting an uplink signal or an uplink channel based on the determined uplink timing.

In some embodiments of this disclosure, a non-transitory computer readable medium is provided. The non-transitory computer readable medium stores a set of instructions that is executable by at least one processor of a base station in a mobile communication system to perform a method. The method includes: transmitting, to a user equipment (UE), a medium access control (MAC) control element (CE) comprising a value for calculating a propagation delay (PD) compensation; wherein the UE is configured to determine a first timing advance (TA) in response to the value being one of one or more first values, determine a PD compensation based on the value, perform a timing synchronization based on the PD compensation, determine an uplink timing based on the first TA, and transmit an uplink signal or an uplink channel based on the timing synchronization and the uplink timing.

In some embodiments of this disclosure, a non-transitory computer readable medium is provided. The non-transitory computer readable medium stores a set of instructions that is executable by at least one processor of a base station in a mobile communication system to perform a method. The method includes: transmitting, to a user equipment (UE), a timing advance (TA) command medium access control (MAC) control element (CE) comprising a TA command; and transmitting, to the UE, a signaling message comprising a first value associated with a propagation delay (PD), wherein the UE is configured to determine a PD compensation based on the TA command and the first value associated with the PD, perform a timing synchronization based on the PD compensation, determine an uplink timing based on the TA command, and transmit an uplink signal or an uplink channel based on the timing synchronization and the uplink timing.

In some embodiments of this disclosure, a non-transitory computer readable medium is provided. The non-transitory computer readable medium stores a set of instructions that is executable by at least one processor of a base station in a mobile communication system to perform a method. The method includes: transmitting, to a user equipment (UE), a timing advance (TA) command medium access control (MAC) control element (CE) with a first format or a second format, wherein: the TA command MAC CE comprises a TA command, and the TA command MAC CE is formed with: the first format when the TA command has one or more first values, or the second format when the TA command has one or more second values, and wherein the UE is configured to determine a PD compensation based on the one or more first values or the one or more second values.

BRIEF DESCRIPTION OF DRAWINGS

FIG. 3A, FIG. 3B and FIG. 3C show example mappings between logical channels and transport channels in downlink, uplink and sidelink, respectively, according to some aspects of one or more exemplary embodiments of the present disclosure.

FIG. 6 shows example physical signals in downlink, uplink and sidelink according to some aspects of one or more exemplary embodiments of the present disclosure.

FIG. 20 shows an example process according to some aspects of one or more exemplary embodiments of the present disclosure.

FIG. 21 shows an example process according to some aspects of one or more exemplary embodiments of the present disclosure.

DESCRIPTION OF EMBODIMENTS

The following disclosure provides many different embodiments, or examples, for implementing different features of the provided subject matter. Specific examples of arrangements are described below to simplify the present disclosure. These are merely examples and are not intended to be limiting.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
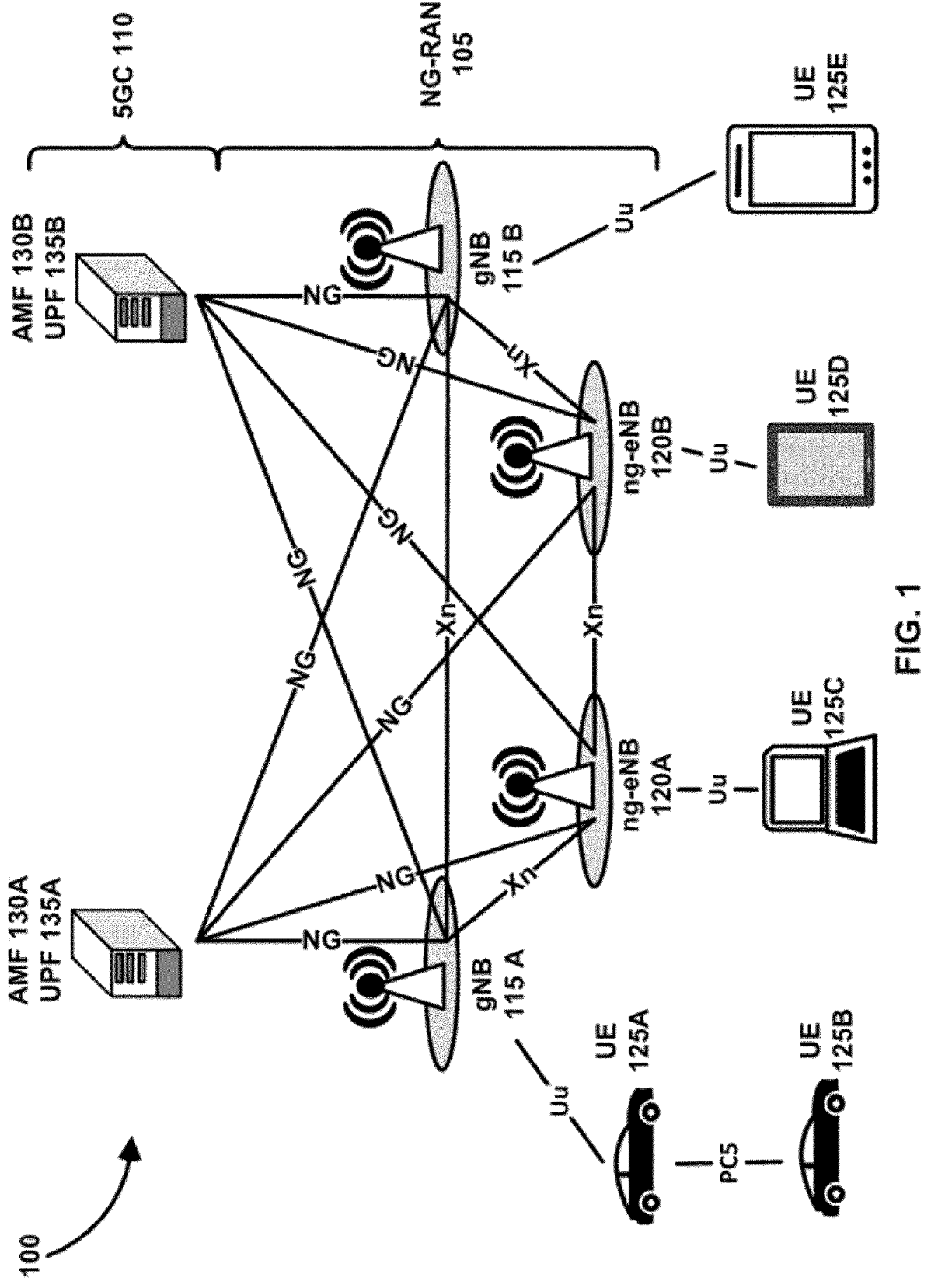
FIG. 1 shows an example of a system of mobile communications according to some aspects of one or more exemplary embodiments of the present disclosure.

FIG. 1 shows an example of a system of mobile communications 100 according to some aspects of one or more exemplary embodiments of the present disclosure. The system of mobile communication 100 may be operated by a wireless communications system operator such as a Mobile Network Operator (MNO), a private network operator, a Multiple System Operator (MSO), an Internet of Things (IOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 (e.g., UE 125A-UE 125E) and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UEs 125 and the RAN (e.g., the NG-RAN 105) may be referred to as Access Stratum (AS) and the functional layer between the UEs 125 and the core network (e.g., the 5GC 110) may be referred to as Non-access Stratum (NAS).

The UEs 125 may include wireless transmission and reception components for communications with one or more nodes in the RAN, one or more relay nodes, or one or more other UEs, etc. Example of the UEs 125 include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for the UEs 125 such as a Mobile Station (MS), terminal equipment, terminal node, client device, mobile device, etc. Still further, UEs 125 may also include components or subcomponents integrated into other devices, such as vehicles, to provide wireless communication functionality with nodes in the RAN, other UEs, satellite communications as described herein. Such other devices may have other functionality or multiple functionalities in addition to wireless communications. Accordingly, reference to UE may include the individual components facilitating the wireless communication as well as the entire device that incorporates components for facilitating wireless communications.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of the NG-RAN 105 may be either a next generation Node B (gNB) 115 (e.g., gNB 115A, gNB 115B) or a next generation evolved Node B (ng-eNB) 120 (e.g., ng-eNB 120A, ng-eNB 120B). In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and General Packet Radio Service (GPRS) Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 (e.g., AMF 130A, AMF 130B) of the 5GC 110 by means of the NG-C interface and to a User Plane Function (UPF) 135 (e.g., UPF 135A, UPF 135B) of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing and forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the medium access control (MAC) layer into two-bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the MAC header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two-bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
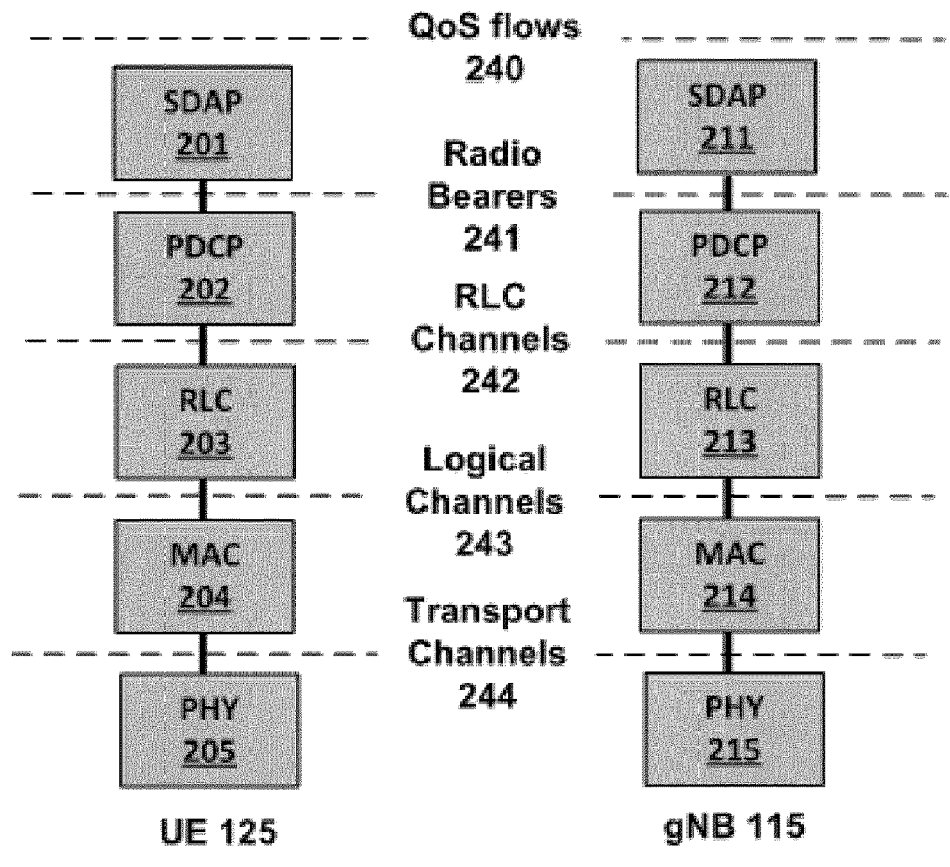
FIG. 2A and FIG. 2B show examples of radio protocol stacks for user plane and control plane, respectively, according to some aspects of one or more exemplary embodiments of the present disclosure.
Figure 2B:
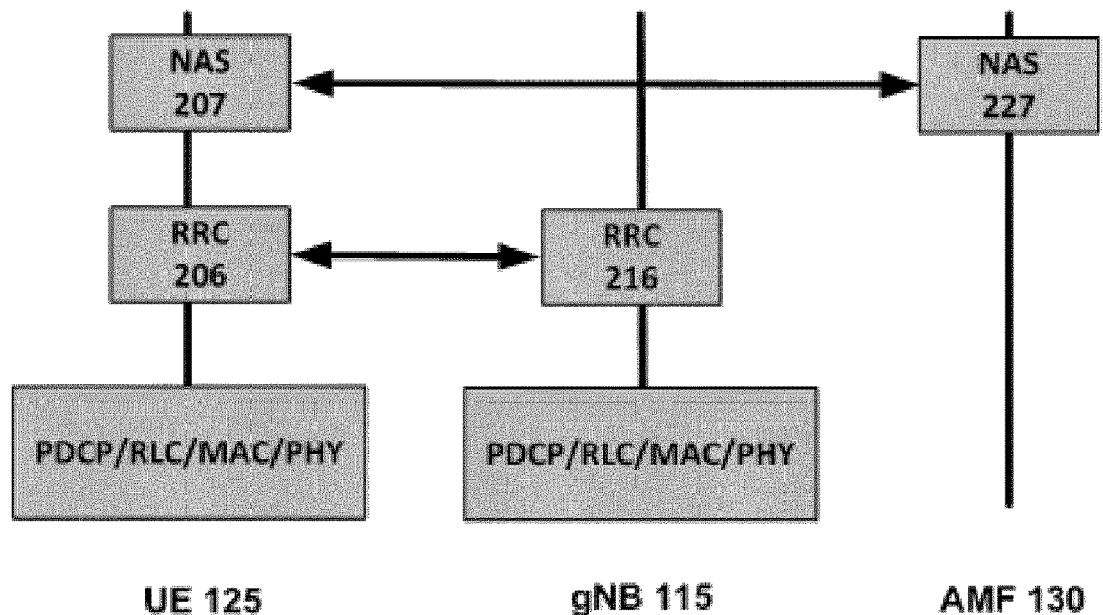

FIG. 2A and FIG. 2B show examples of radio protocol stacks for user plane and control plane, respectively, according to some aspects of one or more exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PDCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of one or more exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by pre-defined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

Figures 4A, 4B, 4C:
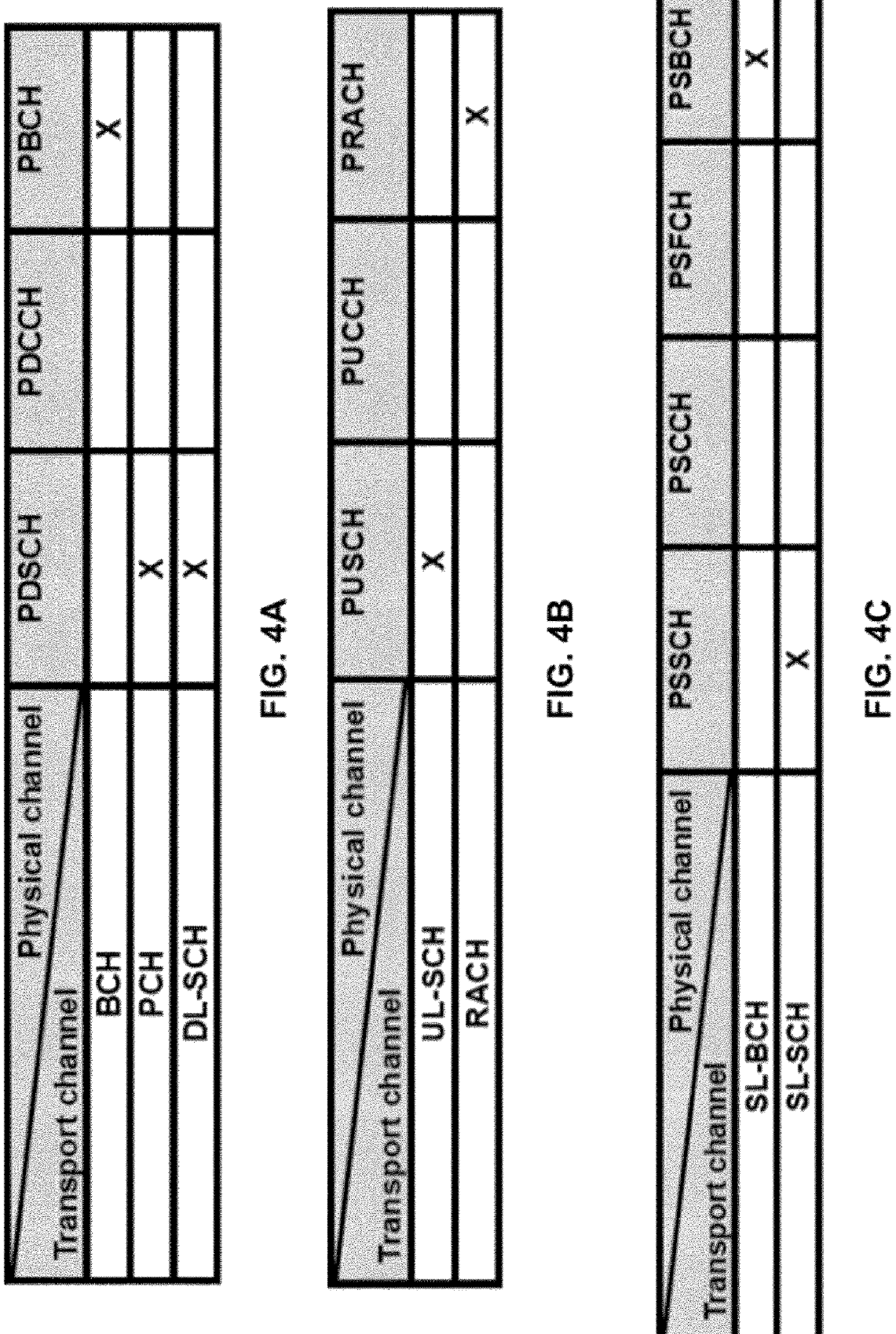
FIG. 4A, FIG. 4B and FIG. 4C show example mappings between transport channels and physical channels in downlink, uplink and sidelink, respectively, according to some aspects of one or more exemplary embodiments of the present disclosure.

FIG. 4A, FIG. 4B and FIG. 4C show example mappings between transport channels and physical channels in downlink, uplink and sidelink, respectively, according to some aspects of one or more exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and Channel State Information (CSI) feedback triggers, etc. At least six Orthogonal Frequency Division Multiplexing (OFDM) symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may be mapped to the PSCCH.

Figures 5A, 5B, 5C, 5D:
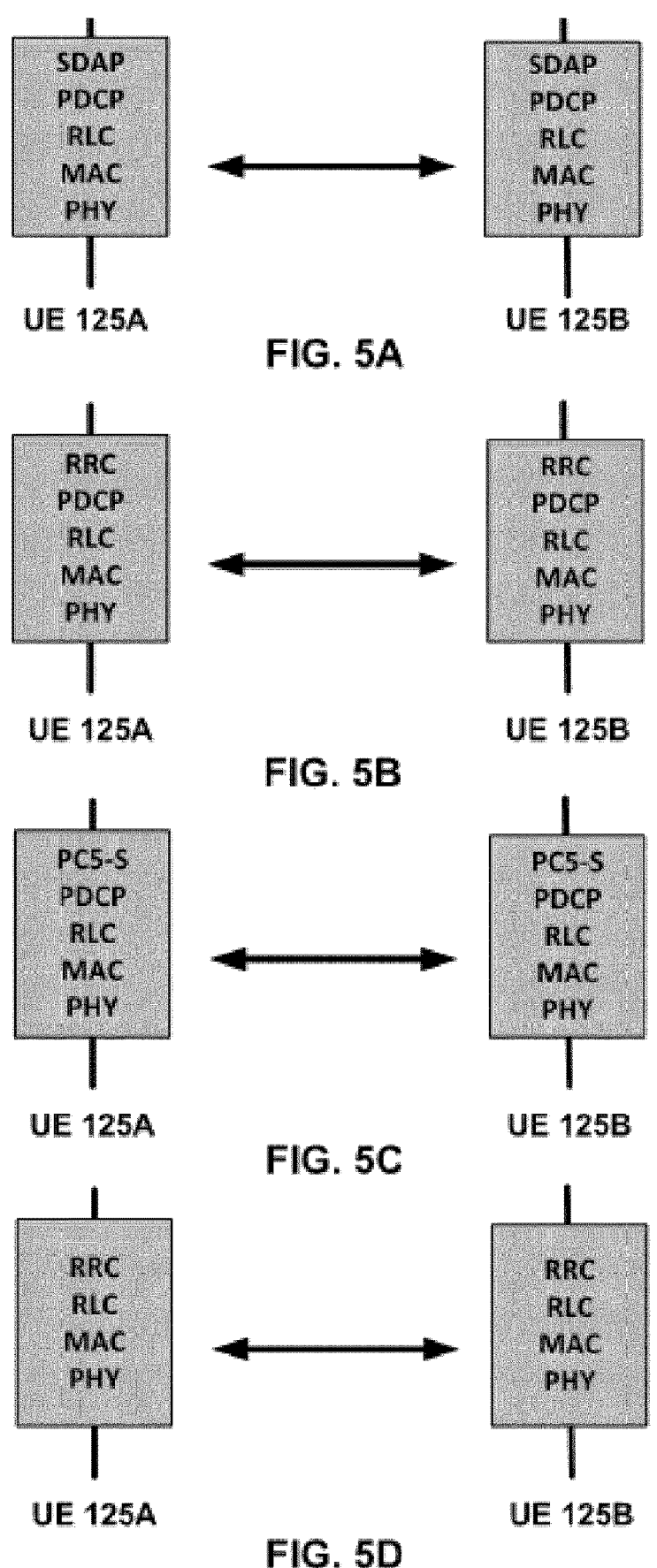
FIG. 5A, FIG. 5B, FIG. 5C and FIG. 5D show examples of radio protocol stacks for NR sidelink communication according to some aspects of one or more exemplary embodiments of the present disclosure.

FIG. 5A, FIG. 5B, FIG. 5C and FIG. 5D show examples of radio protocol stacks for NR sidelink communication according to some aspects of one or more exemplary embodiments of the present disclosure. The AS protocol stack for user plane in the PC5 interface (i.e., for STCH)

may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of one or more exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC control element (CE). The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
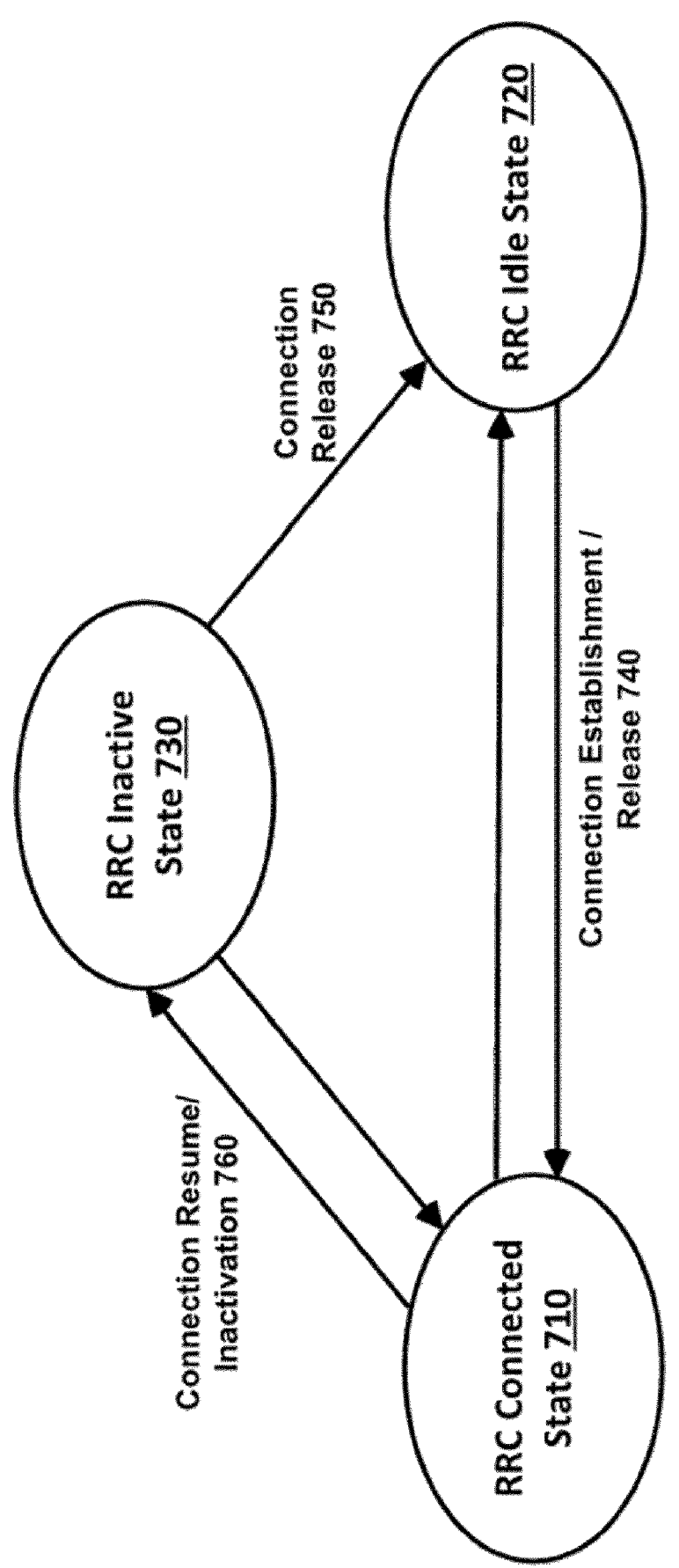
FIG. 7 shows examples of Radio Resource Control (RRC) states and transitioning between different RRC states according to some aspects of one or more exemplary embodiments of the present disclosure.

FIG. 7 shows examples of Radio Resource Control (RRC) states and transitioning between different RRC states according to some aspects of one or more exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
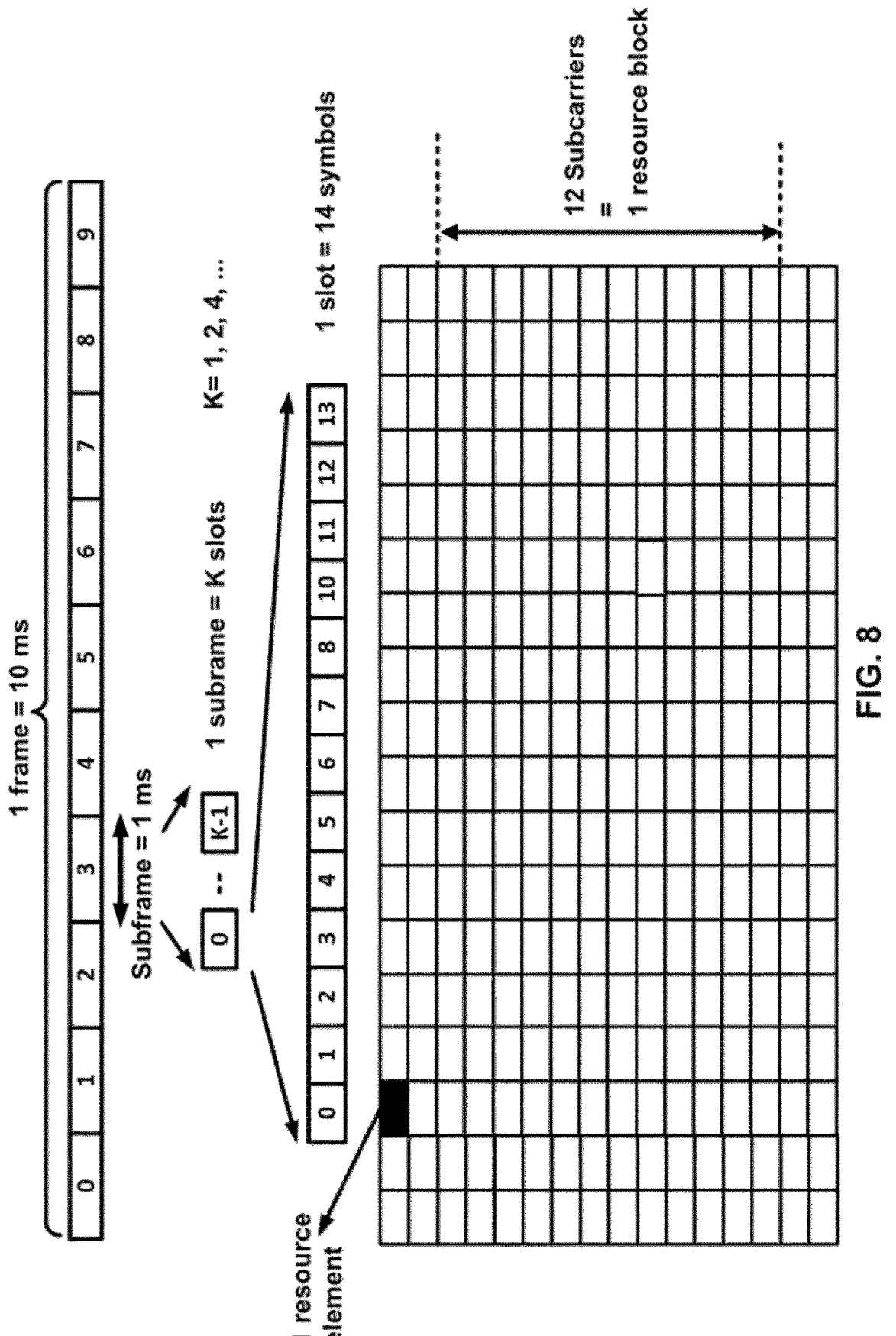
FIG. 8 shows example frame structure and physical resources according to some aspects of one or more exemplary embodiments of the present disclosure.

FIG. 8 shows example frame structure and physical resources according to some aspects of one or more exemplary embodiments of the present disclosure. The downlink or uplink or sidelink transmissions may be organized into frames with 10 ms duration, consisting of ten (0 to 9) 1 ms subframes. Each subframe may consist of k slots (k=1, 2, 4, . . . ), wherein the number of slots k per subframe may depend on the subcarrier spacing of the carrier on which the transmission takes place. The slot duration may be 14 (0 to 13) symbols with Normal Cyclic Prefix (CP) and 12 symbols with Extended CP and may scale in time as a function of the used sub-carrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example, during two, four, or seven OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
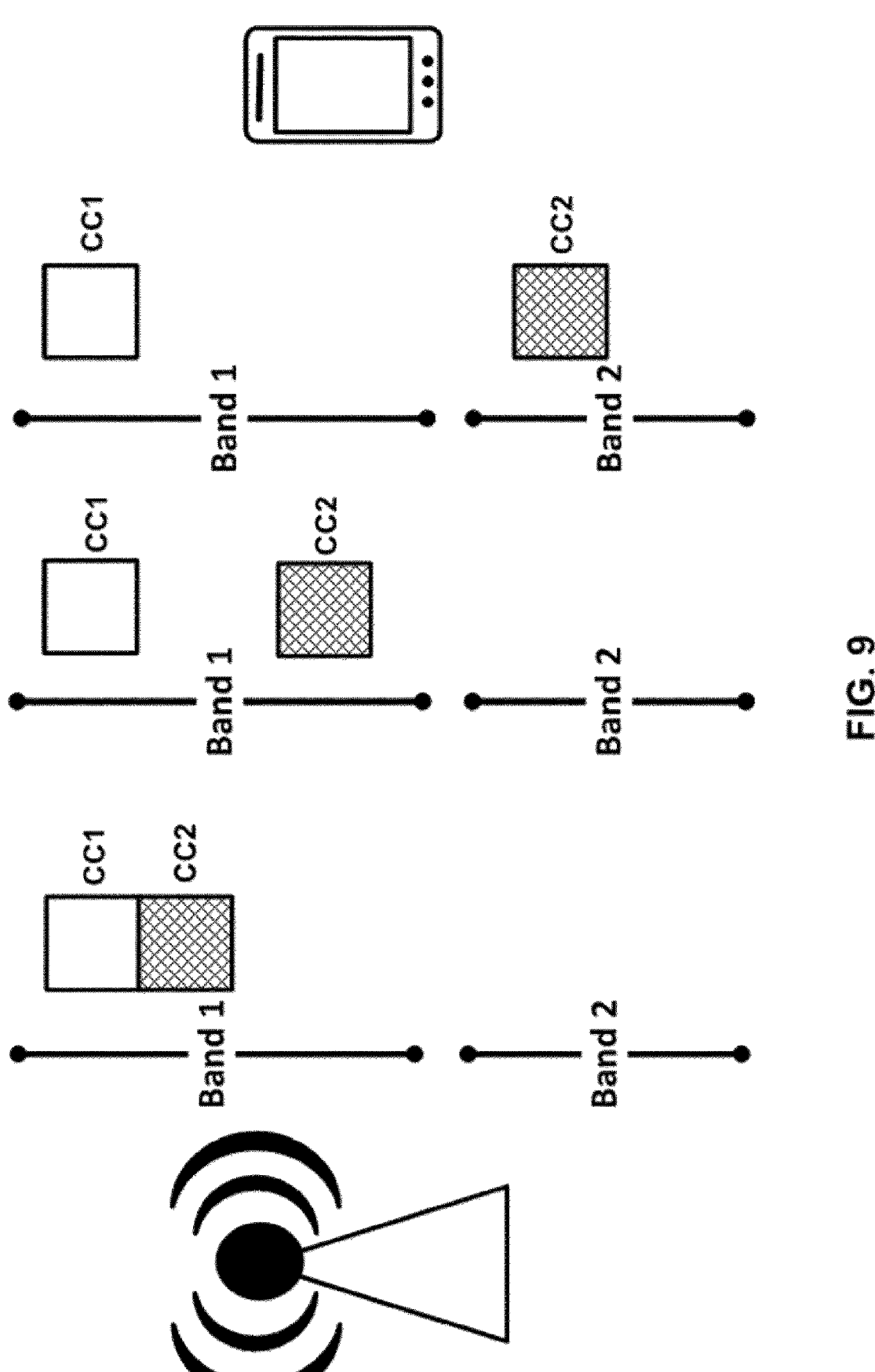
FIG. 9 shows example component carrier configurations in different carrier aggregation scenarios according to some aspects of one or more exemplary embodiments of the present disclosure.

FIG. 9 shows example component carrier configurations in different carrier aggregation scenarios according to some aspects of one or more exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance (TA) to keep the L1 synchronized. Serving cells having uplink to which the same TA applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single TA capability for CA may simultaneously receive and/or transmit on multiple CCs corresponding to multiple serving cells sharing the same TA (multiple serving cells grouped in one TAG). A UE with multiple TA capability for CA may simultaneously receive and/or transmit on multiple CCs corresponding to multiple serving cells with different TAs (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
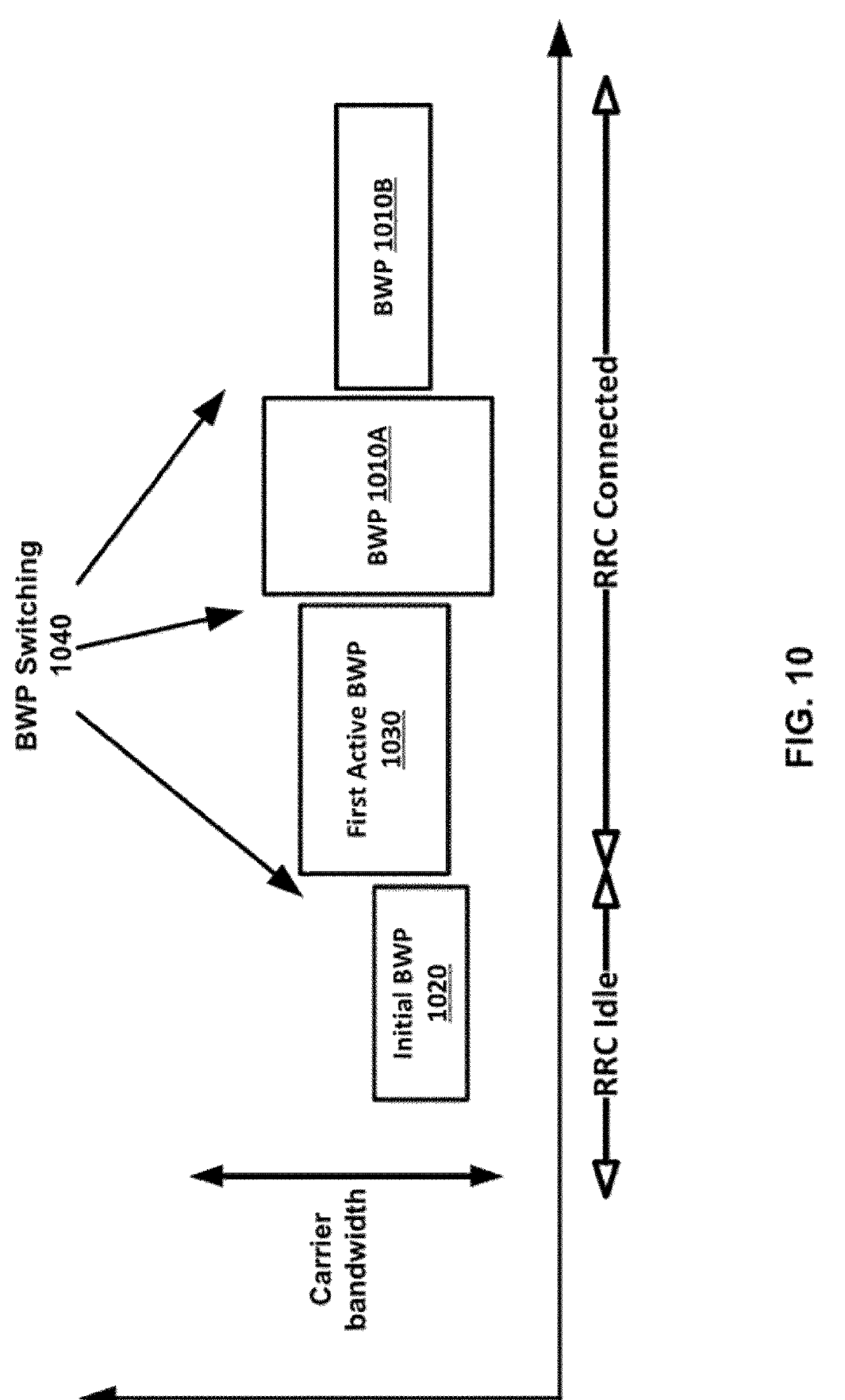
FIG. 10 shows example bandwidth part configuration and switching according to some aspects of one or more exemplary embodiments of the present disclosure.

FIG. 10 shows example bandwidth part configuration and switching according to some aspects of one or more exemplary embodiments of the present disclosure. The UE may be configured with one or more Bandwidth Parts (BWPs) 1010 (e.g., 1010A, 1010B) on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example, through BWP switching 1040, the receive and transmit bandwidth of a UE may not be as large as the bandwidth of the cell and may be adjusted. For example, the width may be ordered to change (e.g., to shrink during period of low activity to save power); the location may move in the frequency domain (e.g., to increase scheduling flexibility); and the subcarrier spacing may be ordered to change (e.g., to allow different services). The first active BWP 1030 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
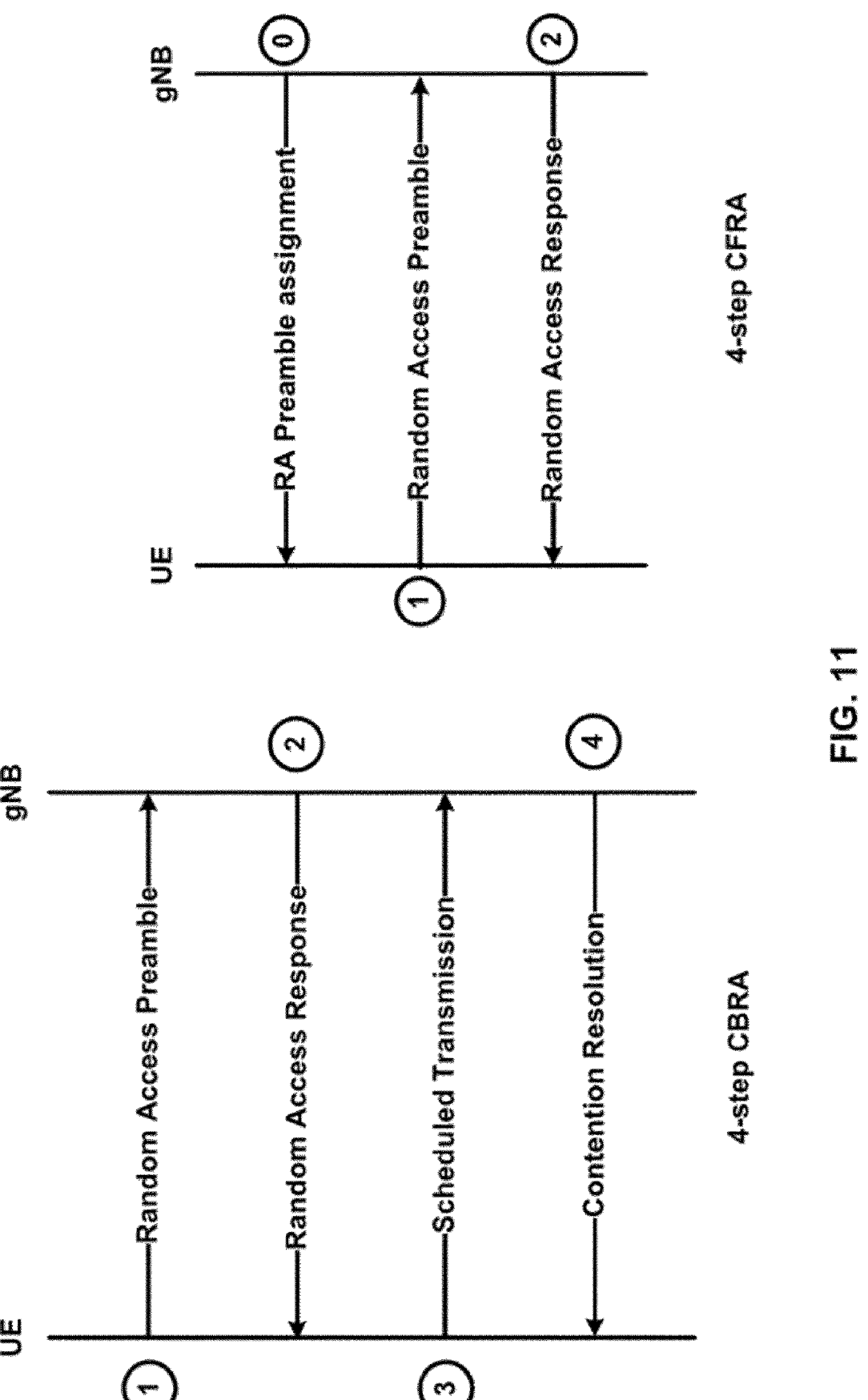
FIG. 11 shows example four-step contention-based and contention-free random access processes according to some aspects of one or more exemplary embodiments of the present disclosure.
Figure 12:
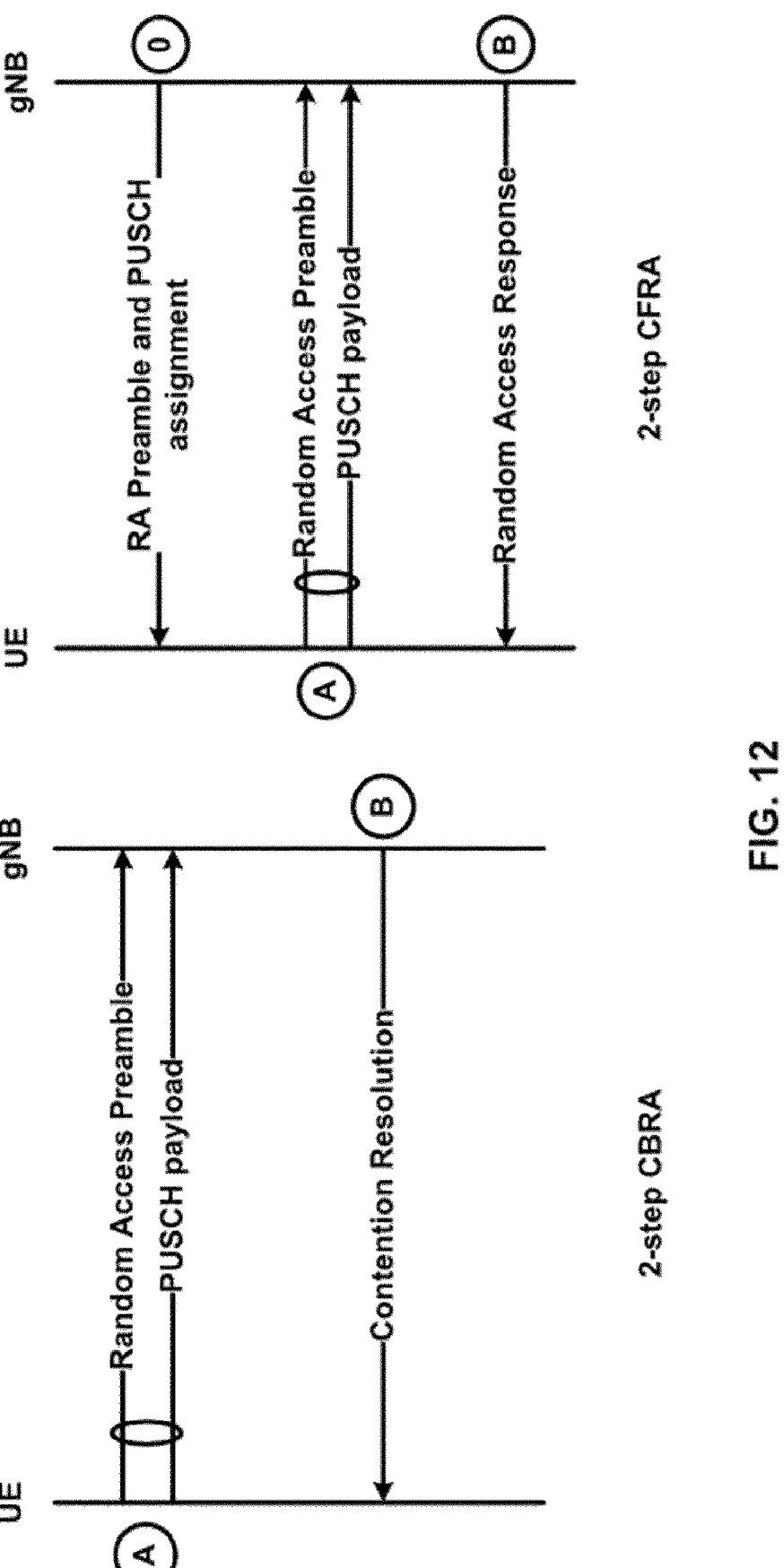
FIG. 12 shows example two-step contention-based and contention-free random access processes according to some aspects of one or more exemplary embodiments of the present disclosure.

FIG. 11 shows example four-step contention-based random access (CBRA) and contention-free random access (CFRA) processes according to some aspects of one or more exemplary embodiments of the present disclosure. FIG. 12 shows example two-step contention-based random access (CBRA) and contention-free random access (CFRA) processes according to some aspects of one or more exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g., handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH (Step 1 of CBRA in FIG. 11). After MSG1 transmission, the UE may monitor for a response from the network within a configured window (Step 2 of CBRA in FIG. 11). For CFRA, dedicated preamble for MSG1 transmission may be assigned by the network (Step 0 of CFRA of FIG. 11) and upon receiving Random Access Response (RAR) from the network, the UE may end the random access procedure as shown in FIG. 11 (Steps 1 and 2 of CFRA in FIG. 11). For CBRA, upon reception of the random access response (Step 2 of CBRA in FIG. 11), the UE may send MSG3 using the uplink grant scheduled in the random access response (Step 3 of CBRA in FIG. 11) and may monitor contention resolution as shown in FIG. 11

(Step 4 of CBRA in FIG. 11). If contention resolution is not successful after MSG3 (re)transmission(s), the UE may go back to MSG1 transmission.

The MSGA of the 2-step RA type may include a preamble on PRACH and a payload on PUSCH (e.g., Step A of CBRA in FIG. 12). After MSGA transmission, the UE may monitor for a response from the network within a configured window. For CFRA, dedicated preamble and PUSCH resource may be configured for MSGA transmission (Steps 0 and A of CFRA in FIG. 12) and upon receiving the network response (Step B of CFRA in FIG. 12), the UE may end the random access procedure as shown in FIG. 12. For CBRA, if contention resolution is successful upon receiving the network response (Step B of CBRA in FIG. 12), the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
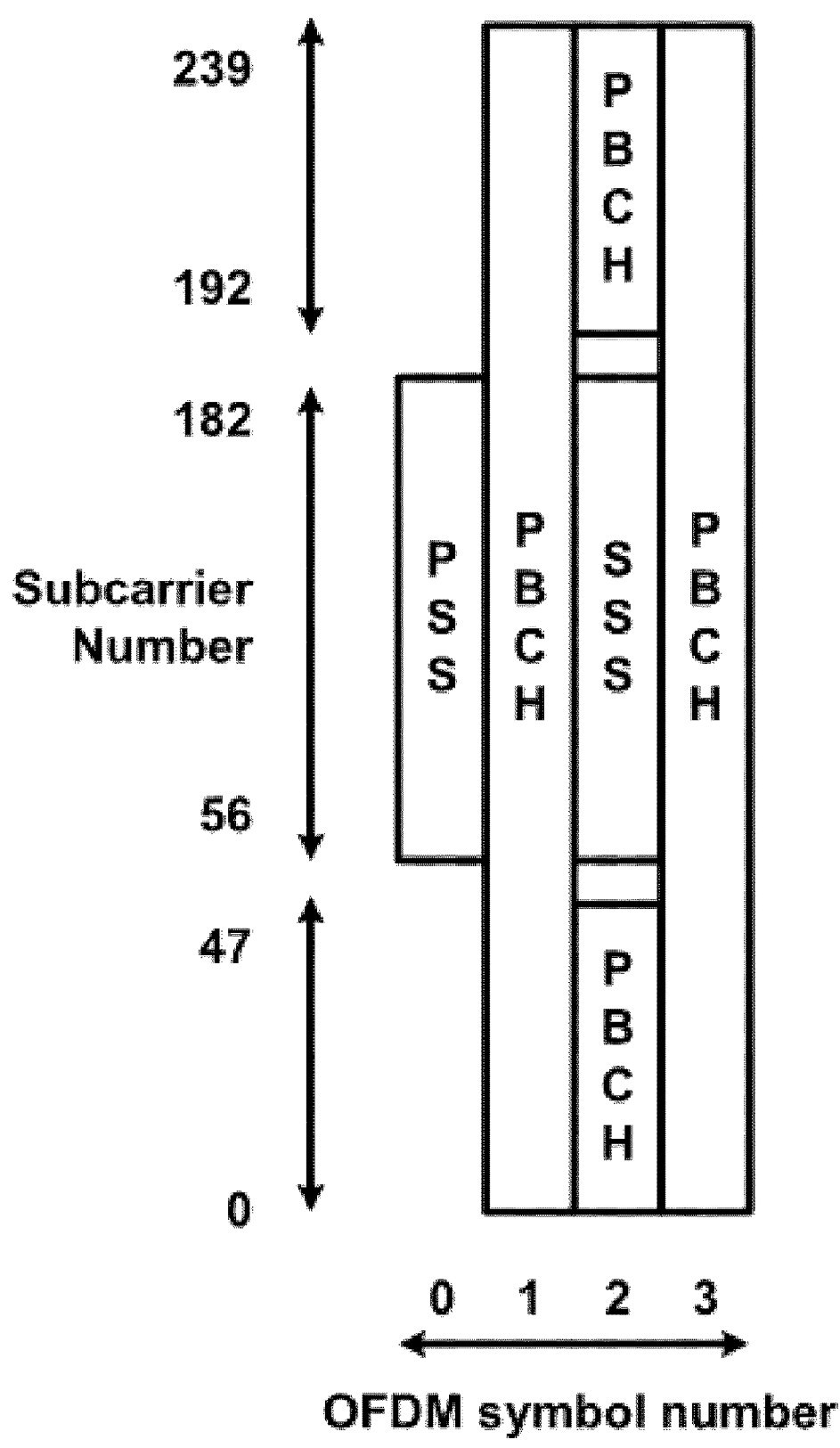
FIG. 13 shows example time and frequency structure of Synchronization Signal and Physical Broadcast Channel (PBCH) Block (SSB) according to some aspects of one or more exemplary embodiments of the present disclosure.

FIG. 13 shows example time and frequency structure of Synchronization Signal and Physical Broadcast Channel (PBCH) Block (SSB) according to some aspects of one or more exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e., using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
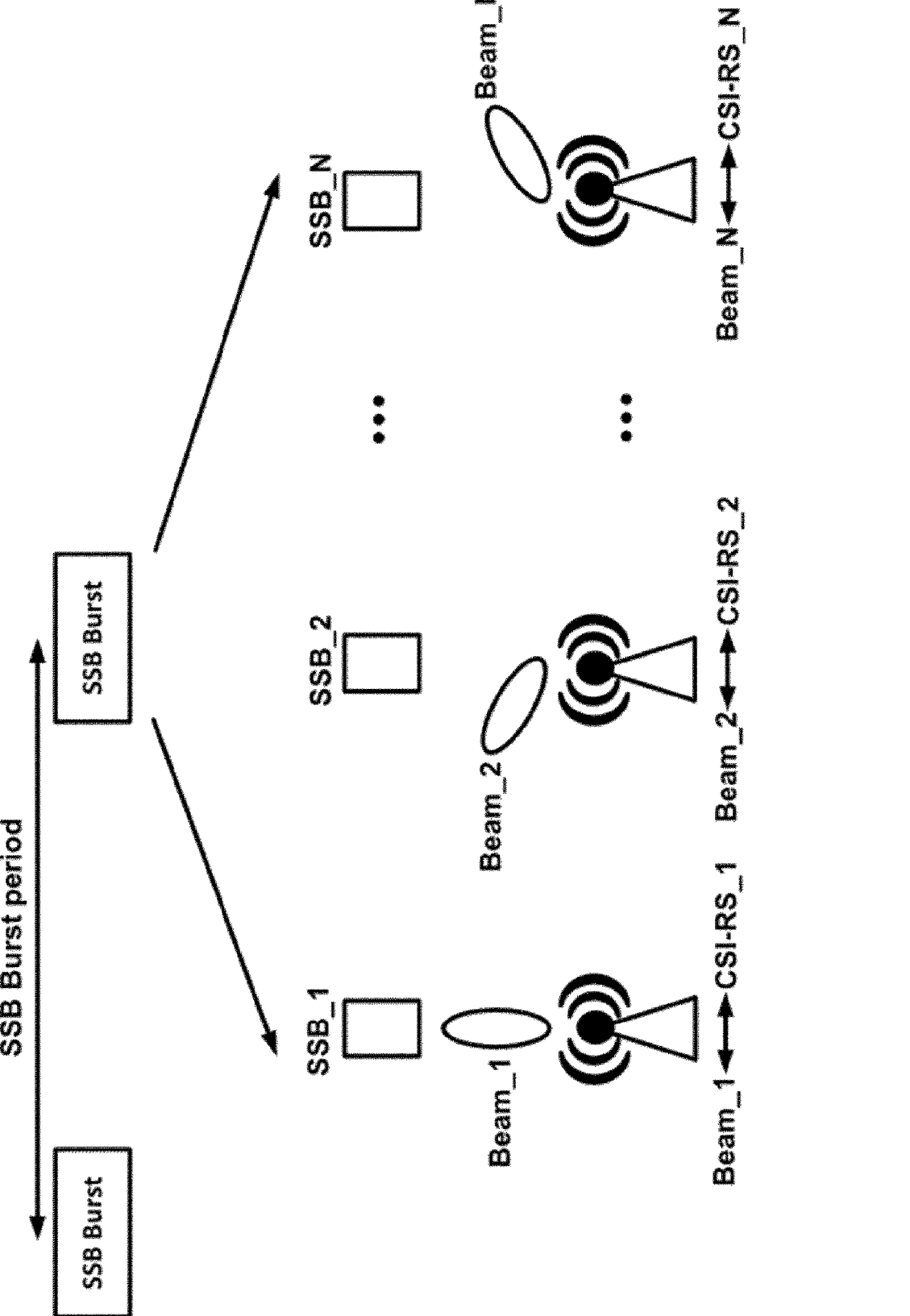
FIG. 14 shows example SSB burst transmissions according to some aspects of one or more exemplary embodiments of the present disclosure.

FIG. 14 shows example SSB burst transmissions according to some aspects of one or more exemplary embodiments of the present disclosure. An SSB burst may include N SSBs (e.g., SSB_1, SSB_2, . . . , SSB_N) and each SSB of the N SSBs may correspond to a beam (e.g., Beam_1, Beam_2, . . . , Beam_N). The SSB bursts may be transmitted according to a periodicity (e.g., SSB burst period). During a contention-based random access process, a UE may perform a random access resource selection process, wherein the UE first selects an SSB before selecting an RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource (e.g., CSI-RS_1, CSI-RS_2, . . . , CSI-RS_N). A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC control element and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depend on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
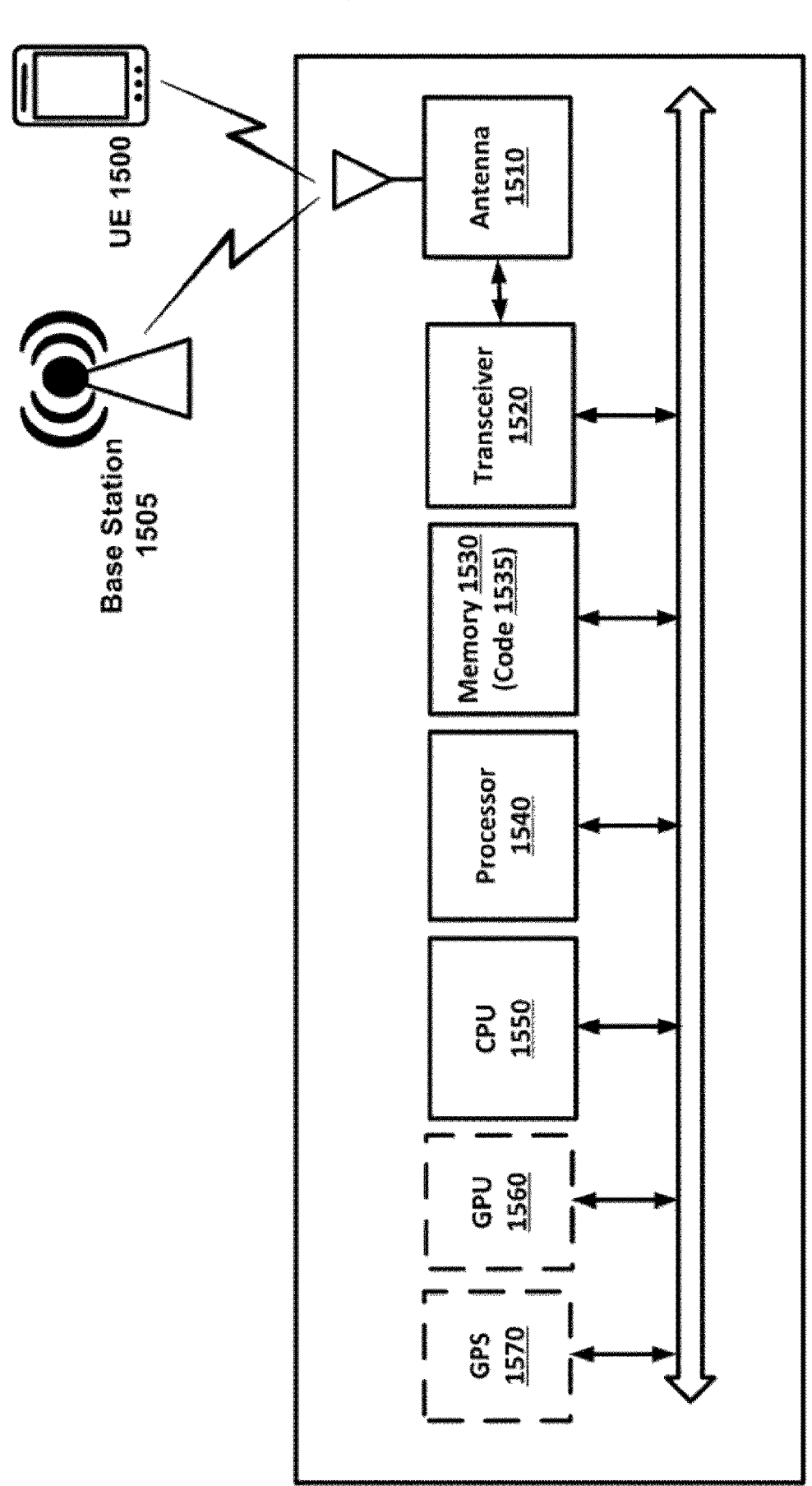
FIG. 15 shows example components of a user equipment and a base station for transmission and/or reception according to some aspects of one or more exemplary embodiments of the present disclosure.

FIG. 15 shows example components of a user equipment and a base station for transmission and/or reception according to some aspects of one or more exemplary embodiments of the present disclosure. In one embodiment, the illustrative components of FIG. 15 may be considered to be illustrative of functional blocks of an illustrative base station 1505. In another embodiment, the illustrative components of FIG. 15 may be considered to be illustrative of functional blocks of an illustrative user equipment (UE) 1500. Accordingly, the components illustrated in FIG. 15 are not necessarily limited to either a UE or base station.

With reference to FIG. 15, the Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 1510 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antenna 1510 for transmission, and to demodulate packets received from the Antenna 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general-purpose processor, a digital signal processor (DSP), a central processing unit (CPU), a microcontroller, an application specific integrated circuit (ASIC), a field programmable gate array (FPGA), a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The CPU 1550 may perform basic arithmetic, logic, controlling, and Input/output (I/O) operations specified by the computer instructions in the Memory 1530. The UE 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the UE 1500 and/or the base station 1505. The GPS 1570 may be used for enabling location-based services or other services for example based on geographical position of the UE 1500.

In some examples, the UE 1500 may be configured to or programmed for time sensitive networking (TSN) communications. The UE 1500 may include a memory (e.g., memory 1530 of FIG. 15) storing instructions (e.g., code 1535 of FIG. 15) and a processor (e.g., processor 1540 of FIG. 15) configured to or programmed to execute the instructions to perform a method. The method includes:

receiving a medium access control (MAC) control element (CE) including a value for calculating a propagation delay (PD) compensation; determining a first timing advance (TA) in response to the value being one of one or more first values; determining a PD compensation based on the value; performing a timing synchronization based on the PD compensation; determining an uplink timing based on the first TA; and transmitting an uplink signal or an uplink channel based on the timing synchronization and the uplink timing. The UE 1500 may receive the MAC CE including the value from a base station (e.g., base station 1505).

In some examples, the UE 1500 may be configured to or programmed for time sensitive networking (TSN) communications. The UE 1500 may include a memory (e.g., memory 1530 of FIG. 15) storing instructions (e.g., code 1535 of FIG. 15) and a processor (e.g., processor 1540 of FIG. 15) configured to or programmed to execute the instructions to perform a method. The method includes: receiving a timing advance (TA) command medium access control (MAC) control element (CE) comprising a TA command; receiving, by the UE, a signaling message comprising a first value associated with a propagation delay (PD); determining a PD compensation based on the TA command and the first value associated with the PD; performing a timing synchronization based on the PD compensation; determining an uplink timing based on the TA command; and transmitting an uplink signal or an uplink channel based on the timing synchronization and the uplink timing. The UE 1500 may receive the TA command MAC CE including the TA command and the signaling message from a base station (e.g., base station 1505).

In some examples, the UE 1500 may be configured to or programmed for time sensitive networking (TSN) communications. The UE 1500 may include a memory (e.g., memory 1530 of FIG. 15) storing instructions (e.g., code 1535 of FIG. 15) and a processor (e.g., processor 1540 of FIG. 15) configured to or programmed to execute the instructions to perform a method. The method includes: receiving, by a user equipment (UE), a timing advance (TA) command medium access control (MAC) control element (CE) with a first format or a second format, wherein: the TA command MAC CE comprises a TA command, and the TA command MAC CE is formed with: the first format when the TA command has one or more first values, or the second format when the TA command has one or more second values; determining an uplink timing based on the TA command; and transmitting an uplink signal or an uplink channel based on the determined uplink timing. The UE 1500 may receive the TA command MAC CE with the first format or the second format from a base station (e.g., base station 1505).

In some examples, the UE 1500 and the base station 1505 are included in a system for mobile communication. The base station may be configured to or programmed to transmit a medium access control (MAC) control element (CE) including a value for calculating a propagation delay (PD) compensation. The user equipment (UE) may be configured to or programmed to: receive the MAC CE; determine a first timing advance (TA) in response to the value being one of one or more first values; determine a PD compensation based on the value; perform a timing synchronization based on the PD compensation; determine an uplink timing based on the first TA; and transmit an uplink signal or an uplink channel based on the timing synchronization and the uplink timing.

In some examples, the UE 1500 and the base station 1505 are included in a system for mobile communication. The base station may be configured to or programmed to transmit a timing advance (TA) command medium access control (MAC) control element (CE) comprising a TA command; and transmit a signaling message comprising a first value associated with a propagation delay (PD). The user equipment (UE) may be configured to or programmed to: receive the TA command MAC CE and the signaling message; determine a PD compensation based on the TA command and the first value associated with the PD; perform a timing synchronization based on the PD compensation; determine an uplink timing based on the TA command; and transmit an uplink signal or an uplink channel based on the timing synchronization and the uplink timing.

In some examples, the UE 1500 and the base station 1505 are included in a system for mobile communication. The base station may be configured to or programmed to transmit a timing advance (TA) command medium access control (MAC) control element (CE) with a first format or a second format. The TA command MAC CE may include a TA command, and the TA command MAC CE may be formed with: the first format when the TA command has one or more first values, or the second format when the TA command has one or more second values. The user equipment (UE) may be configured to or programmed to determine a PD compensation based on the one or more first values or the one or more second values.

In some examples, a DLInformationTransfer message may be used for the downlink transfer of NAS dedicated information and timing information for the 5G internal system clock. The DLInformationTransfer message may comprise a referenceTimeInfo IE.

In some examples, a system information block (SIB, e.g., SIB9) may contain information related to GPS time and Coordinated Universal Time (UTC). The UE may use the parameters provided in this system information block to obtain the UTC, the GPS and the local time. The UE may use the time information for numerous purposes, possibly involving upper layers e.g. to assist GPS initialization, to synchronize the UE clock, etc. The SIB message may comprise a reference TimeInfo IE. The SIB may message may comprise a daylightSavingTime field indicating if and how daylight-saving time (DST) is applied to obtain the local time. A leapSeconds field may indicate the number of leap seconds offset between GPS Time and UTC. A local-TimeOffset field may indicate an offset between UTC and local time. A timeInfoUTC field may coordinate Universal Time corresponding to the SFN boundary at or immediately after the ending boundary of the SI-window in which SIB9 is transmitted.

In some examples, the IE ReferenceTimeInfo may contain timing information for 5G internal system clock used for example, time stamping. A referenceSFN field may indicate the reference SFN corresponding to the reference time information. If referenceTimeInfo field is received in DLInformationTransfer message, this field may indicate the SFN of PCell. A field time may indicate time reference with 10 ns granularity. In some examples, the indicated time may be referenced at the network, e.g., without compensating for RF propagation delay. The indicated time in 10 ns unit from the origin may be refDays*86400*1000*100000+refSeconds*1000*100000+refMilliSeconds*100000+refTenNanoSeconds. The refDays field may specify the sequential number of days (with day count starting at 0) from the origin of the time field. If the referenceTimeInfo field is received in DLInformationTransfer message, the time field may indicate the time at the ending boundary of the system frame indicated by referenceSFN. The UE may consider this frame (indicated by referenceSFN) to be the frame which is nearest to the frame where the message is received (which may be either in the past or in the future). If the referenceTimeInfo field is received in SIB9, the time field may indicate the time at the SFN boundary at or immediately after the ending boundary of the SI-window in which SIB9 is transmitted. If referenceTimeInfo field is received in SIB9, this field may be excluded when determining changes in system information, i.e., changes of time should neither result in system information change notifications nor in a modification of valueTag in SIB1. An uncertainty field may indicate the uncertainty of the reference time information provided by the time field. The uncertainty may be 25 ns multiplied by this field.

In some examples, the RRC may configure a timeAlignmentTimer (per timing advance group (TAG)) for the maintenance of UL time alignment. The parameter timeAlignmentTimer (per TAG) may control how long the MAC entity considers the Serving Cells belonging to the associated TAG to be uplink time aligned.

In some examples, when a Timing Advance Command MAC CE is received, and if an $N_{TA}$ has been maintained with the indicated TAG, the MAC entity may: apply the Timing Advance Command for the indicated TAG; start or restart the timeAlignmentTimer associated with the indicated TAG.

In some examples, when a Timing Advance Command is received in a Random Access Response message for a Serving Cell belonging to a TAG or in a MSGB for an SpCell: if the Random Access Preamble was not selected by the MAC entity among the contention-based Random Access Preamble: the MAC entity may: apply the Timing Advance Command for this TAG; start or restart the timeAlignmentTimer associated with this TAG.

In some examples, when a Timing Advance Command is received in a Random Access Response message for a Serving Cell belonging to a TAG or in a MSGB for an SpCell: if the timeAlignmentTimer associated with this TAG is not running: the MAC entity may: apply the Timing Advance Command for this TAG; and start the timeAlignmentTimer associated with this TAG; when the Contention Resolution is considered not successful or when the Contention Resolution is considered successful for SI request, after transmitting HARQ feedback for MAC PDU including UE Contention Resolution Identity MAC CE: the MAC entity may stop timeAlignmentTimer associated with this TAG.

In some examples, when an Absolute Timing Advance Command is received in response to a MSGA transmission including C-RNTI MAC CE, the MAC entity may apply the Timing Advance Command for primary timing advance group (PTAG); and start or restart the timeAlignmentTimer associated with PTAG.

In an example, when a timeAlignmentTimer expires, if the timeAlignmentTimer is associated with the PTAG, the MAC entity may flush all HARQ buffers for all Serving Cells, notify RRC to release PUCCH for all Serving Cells, if configured; notify RRC to release SRS for all Serving Cells, if configured; clear any configured downlink assignments and configured uplink grants; clear any PUSCH resource for semi-persistent CSI reporting; consider all running timeAlignmentTimers as expired; and maintain $N_{TA}$ of all TAGs.

In an example, when a timeAlignmentTimer expires, if the timeAlignmentTimer is associated with STAG, then for all Serving Cells belonging to this TAG: the MAC entity may: flush all HARQ buffers; notify RRC to release PUCCH, if configured; notify RRC to release SRS, if configured; clear any configured downlink assignments and configured uplink grants; clear any PUSCH resource for semi-persistent CSI reporting; and maintain $N_{TA}$ of this TAG.

In some examples, when the MAC entity stops uplink transmissions for an SCell due to the fact that the maximum uplink transmission timing difference between TAGs of the MAC entity or the maximum uplink transmission timing difference between TAGs of any MAC entity of the UE is exceeded, the MAC entity may consider the timeAlignmentTimer associated with the SCell as expired.

In some examples, the MAC entity may not perform any uplink transmission on a Serving Cell except the Random Access Preamble and MSGA transmission when the timeAlignmentTimer associated with the TAG to which this Serving Cell belongs is not running. Furthermore, when the timeAlignmentTimer associated with the PTAG is not running, the MAC entity may not perform any uplink transmission on any Serving Cell except the Random Access Preamble and MSGA transmission on the SpCell.

Figures 16A, 16B:
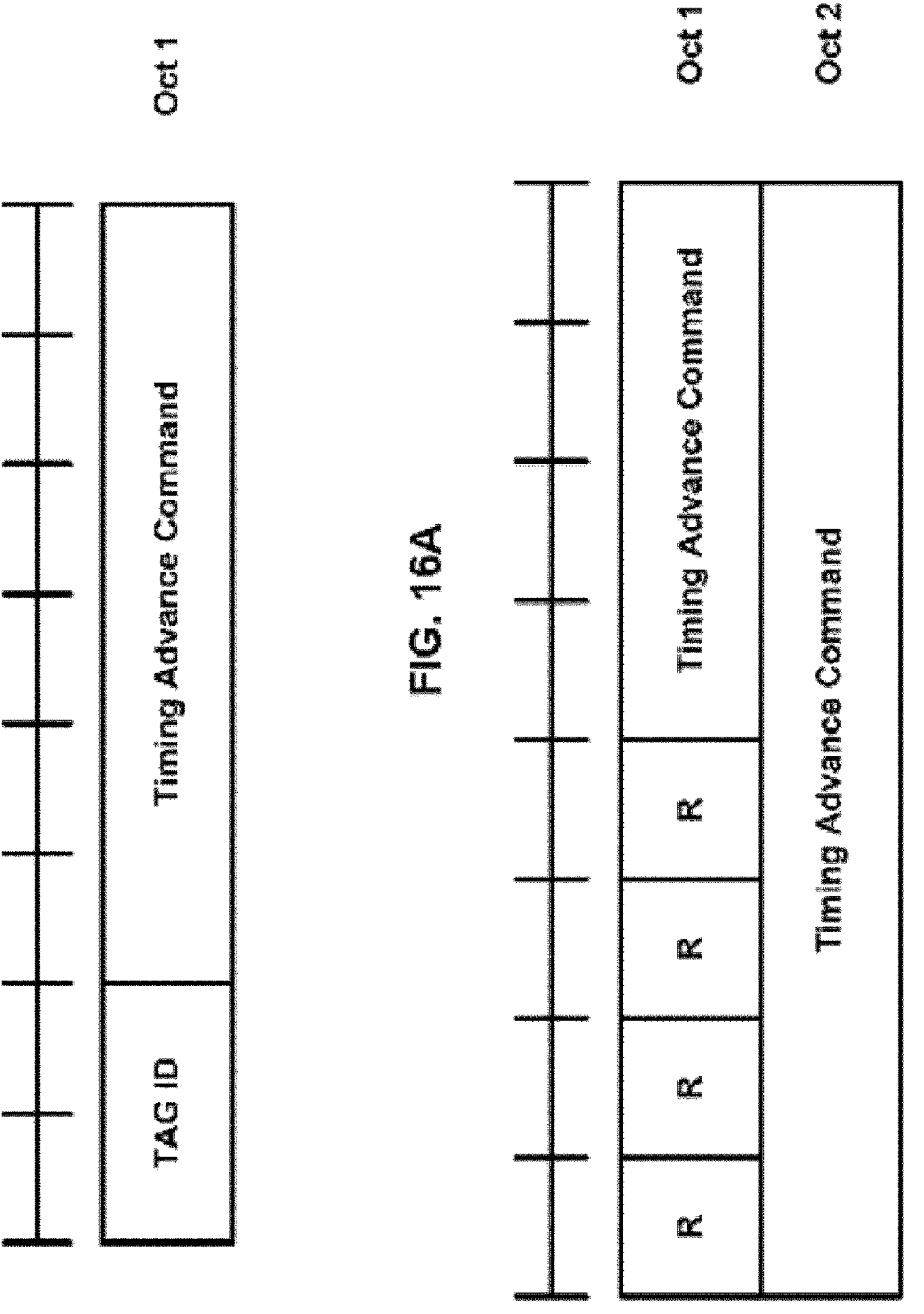
FIG. 16A and FIG. 16B show example timing advance MAC CE according to some aspects of some of one or more exemplary embodiments of the present disclosure.

In an example, a Timing Advance Command MAC CE may be identified by MAC subheader with a corresponding LCID. The Timing Advance Command MAC CE may have a fixed size and may consist of a single octet (e.g., Oct 1 as shown in FIG. 16A): TAG Identity (TAG ID): This field may indicate the TAG Identity of the addressed TAG. The TAG containing the SpCell may have the TAG Identity 0. The length of the field may be 2 bits; Timing Advance Command: This field may indicate the index value TA (0, 1, 2 . . . 63) used to control the amount of timing adjustment that MAC entity has to apply. The length of the field may be 6 bits.

In some examples, an absolute Timing Advance Command MAC CE may be identified by MAC subheader with a corresponding eLCID. The absolute Timing Advance Command MAC CE may have a fixed size and may consist of two octets defined as follows (e.g., Oct 1 and Oct 2 as shown in FIG. 16B): Timing Advance Command: This field may indicate the index value of TA used to control the amount of timing adjustment that the MAC entity has to apply. The size of the field may be 12 bits; R: Reserved bit, set to "0".

In some examples, a UE may be provided a value $N_{TA,offset}$ of a TA offset for a serving cell by n-TimingAdvanceOffset for the serving cell. If the UE is not provided n-TimingAdvanceOffset for a serving cell, the UE may determine a default value $N_{TA,offset}$ of the TA offset for the serving cell.

In some examples, if a UE is configured with two UL carriers for a serving cell, a same TA offset value $N_{TA,offset}$ may apply to both carriers.

Upon reception of a TA command for a TAG, the UE may adjust uplink timing for PUSCH/SRS/PUCCH transmission on all the serving cells in the TAG based on a value $N_{TA,offset}$ that the UE may expect to be same for all the serving cells in the TAG and based on the received TA command where the uplink timing for PUSCH/SRS/PUCCH transmissions is the same for all the serving cells in the TAG.

In some examples, for a subcarrier spacing (SCS) of $$2^{\mu} \cdot 15 \qquad\qquad \text{[Math.1]}$$

kHz, the TA command for a TAG may indicate the change of the uplink timing relative to the current uplink timing for the TAG in multiples of $$16 \cdot 64 \cdot T_c/2^{\mu} \qquad\qquad \text{[Math.2]}$$

.TA.

In some examples in case of random access response, a TA command, $T_A$, for a TAG may indicate $N_{TA}$ values by index values of $T_A$=0, 1, 2, . . . , 3846, where an amount of the time alignment for the TAG with SCS of $$2^\mu \cdot 15 \qquad \text{[Math.3]}$$

kHz may be $$N_{TA}=T_A \cdot 16 \cdot 64/2^\mu \qquad \text{[Math.4]}$$

.$N_{TA}$ may be relative to the SCS of the first uplink transmission from the UE after the reception of the random access response.

In some examples, a TA command, $T_A$, for a TAG may indicate adjustment of a current $N_{TA}$ value, $N_{TA\_old}$, to the new $N_{TA}$ value, $N_{TA\_new}$, by index values of $T_A$=0, 1, 2, . . . , 63, where for a SCS of $$2^\mu \cdot 15 \qquad \text{[Math.5]}$$

kHz, $$N_{TA\_new}=N_{TA\_old}+(T_A-31)\cdot 16 \cdot 64/2^\mu \qquad \text{[Math.6]}$$

In some examples, if a UE has multiple active UL BWPs in a same TAG, including UL BWPs in two UL carriers of a serving cell, the TA command value may be relative to the largest SCS of the multiple active UL BWPs. The applicable $N_{TA\_new}$ value for an UL BWP with lower SCS may be rounded to align with the TA granularity for the UL BWP with the lower SCS while satisfying the TA accuracy requirements.

In some examples, adjustment of an $N_{TA}$ value by a positive or a negative amount may indicate advancing or delaying the uplink transmission timing for the TAG by a corresponding amount, respectively.

In some examples, a gNB may provide the referenceTime (which may be pointed to a specific SFN) to the UE via SIB/DLInfomationTransfer. The UE may trigger RACH to obtain an NTA closest to the provided referenceTime, after receiving the propagation compensation indication required by the network. In some examples, NTA/2 may be used for the propagation delay compensation of the reference time.

In some examples, propagation delay compensation may be applied by the time sensitive networking (TSN) UEs for larger service areas. In some examples, propagation delay compensation may be UE-based and/or network-based.

In some examples, for the UE-based method, the network may indicate the absolute timing of the reference point to the UE. The UE may perform propagation delay compensation when it receives the reference timing information, e.g., the received reference timing plus the propagation delay, which may be the timing of reference point the UE receives. The reference timing information may be sent by SIB9 and/or dedicated RRC signaling. In some examples, the propagation delay may be assumed to be half of TA indicated by the network. In some examples, the propagation delay may be affected by TA indication granularity.

In some examples, for the network-based method, the propagation delay may be considered in the reference timing information provided by the network. The reference timing information provided by the network may be the absolute timing of the reference point plus propagation delay. The received reference timing may be the timing that the UE receives the reference point. In this case, the reference timing information may be sent only by dedicated RRC signaling.

In some examples, the timing of reference point the UE receives may be the reference timing provided by the gNB plus the propagation delay. The propagation delay may be half of the value of the TA of a UE. The accuracy of TA may affect the accuracy of Uu interface.

In some examples, reference timing sources (e.g., TSN Grandmaster clocks) may be located at end stations reachable through a UPF/NW-TT. In some examples, an end station connected to UE may serve as a TSN Grandmaster clock. In some examples, two Uu interfaces may be involved in the 5GS path (e.g., the 5GS ingress to the 5GS egress) over which a TSN Grandmaster clock is relayed. In some examples, the delay experienced when sending a TSN Grandmaster clock over a 5GS path may be measured using timestamping performed at the 5GS ingress and 5G egress points, thereby allowing the TSN Grandmaster to be updated to reflect the delay over the 5GS path. In some examples, timestamping may be performed using a 5G system clock (5G reference time) made available to the 5GS point of ingress and 5GS point of egress. Sending the 5G system clock from the gNB to any given UE may introduce uncertainty between this clock at the gNB relative to this same clock at the UE. In some examples, where a TSN Grandmaster clock may be at an end station connected to a first UE and needs to be relayed to an end station connected to a second UE, the two Uu interfaces may introduce a combined uncertainty that exceeds an acceptable limit. A major contribution to the uncertainty introduced by the Uu interface occurs when the 5G system clock sent to a UE is adjusted to reflect the downlink propagation delay. For the radio link, the propagation delay is estimated as half of the Timing Advance. In some examples, two methods may be possible for determining the downlink propagation delay value used to adjust the 5G reference time. The two methods are (1) Timing Advanced based, and (2) time-difference measurement based. In the Time Advanced based method, the legacy Timing Advance procedure may be used for determining the downlink propagation delay. This legacy procedure may need to be further evaluated to determine which corresponding sources of uncertainty may be mitigated towards satisfying the synchronicity requirement per Uu interface.

In some examples, propagation delay compensation may be applied when the distance between the UE and the gNB is larger than a threshold, for examples, in large cell use-cases. In some examples, the propagation delay compensation may not be performed by the gNB and may be done by the UE. In some examples, TA may be used to compensate for the timing misalignment between UL transmissions of different UEs due to their respective propagation delays. In some examples, the network may estimate and pre-compensate for the propagation delay on a per-UE basis and use the UE-specific signaling to indicate and/or fine tune the indicated time reference. In some examples, the UE based compensation may depend on the TA command granularity from the gNB while on the other hand.

In some examples, a field delayCompensationAllowed may be introduced in the IE ReferenceTimeInfo. In some examples, the propagation delay compensation may be performed at the network side by the gNB in addition to legacy operation (i.e., at the UE side). In some examples, the network may indicate to the UE (e.g., via a unicast RRC signaling) when pre-compensation has been performed by the gNB. In some examples, propagation delay compensation (PDC) may be performed conditionally, e.g., according to the UE-gNB distance. In some examples, an enable/disable indication in SIB may be used to explicitly disable propagation delay compensation for the small cell deployment scenario. In some examples, a UE may perform propagation delay compensation with $N_{TA}/2$ and may apply when necessary.

In some examples, the gNB may perform propagation delay compensation with $N_{TA}/2$ and may apply this when necessary. In some examples, an indication may be used for indicating whether the gNB performs propagation delay compensation. For example, if such indication set to TRUE, the UE may not perform propagation delay compensation, otherwise, the UE may perform propagation delay compensation by itself when necessary. In some example, a UE may report its capability to gNB on whether it can support propagation delay compensation.

In some examples, a time advance (TA)-based propagation delay compensation may be used. In some examples, the Propagation delay estimation may be based on Timing Advance (e.g., with enhanced TA indication granularity). In some examples, the propagation delay estimation may be based on TA enhanced for time synchronization. In some example, propagation delay estimation based on a dedicated signaling with fine delay compensation granularity (e.g., a separated signaling from TA so that TA procedure is not affected).

In some examples, PD estimation may be conducted by the gNB, and the gNB may construct TA command (e.g., with enhanced TA indication granularity) or a new dedicated signaling with finer delay compensation granularity. PD compensation may be conducted by the UE after obtaining the propagation delay value indicated by the gNB. In some examples, the network may perform PD pre-compensation. The propagation delay estimation as well as propagation delay compensation may be conducted by the gNB, and the pre-compensation may be indicated to the UE.

In some examples, an indication in the network to UE signaling may include information that indicates that the time information was pre-compensated.

Propagation delay compensation may be illustratively implemented to achieve timing synchronization with improved a high accuracy for time sensitive networking (TSN) applications. Existing signaling for propagation delay compensation determination and/or indication may lead to inefficient timing synchronization and degraded user experience. Example embodiments enhance the propagation delay compensation determination and/or indication signaling.

Figure 17:
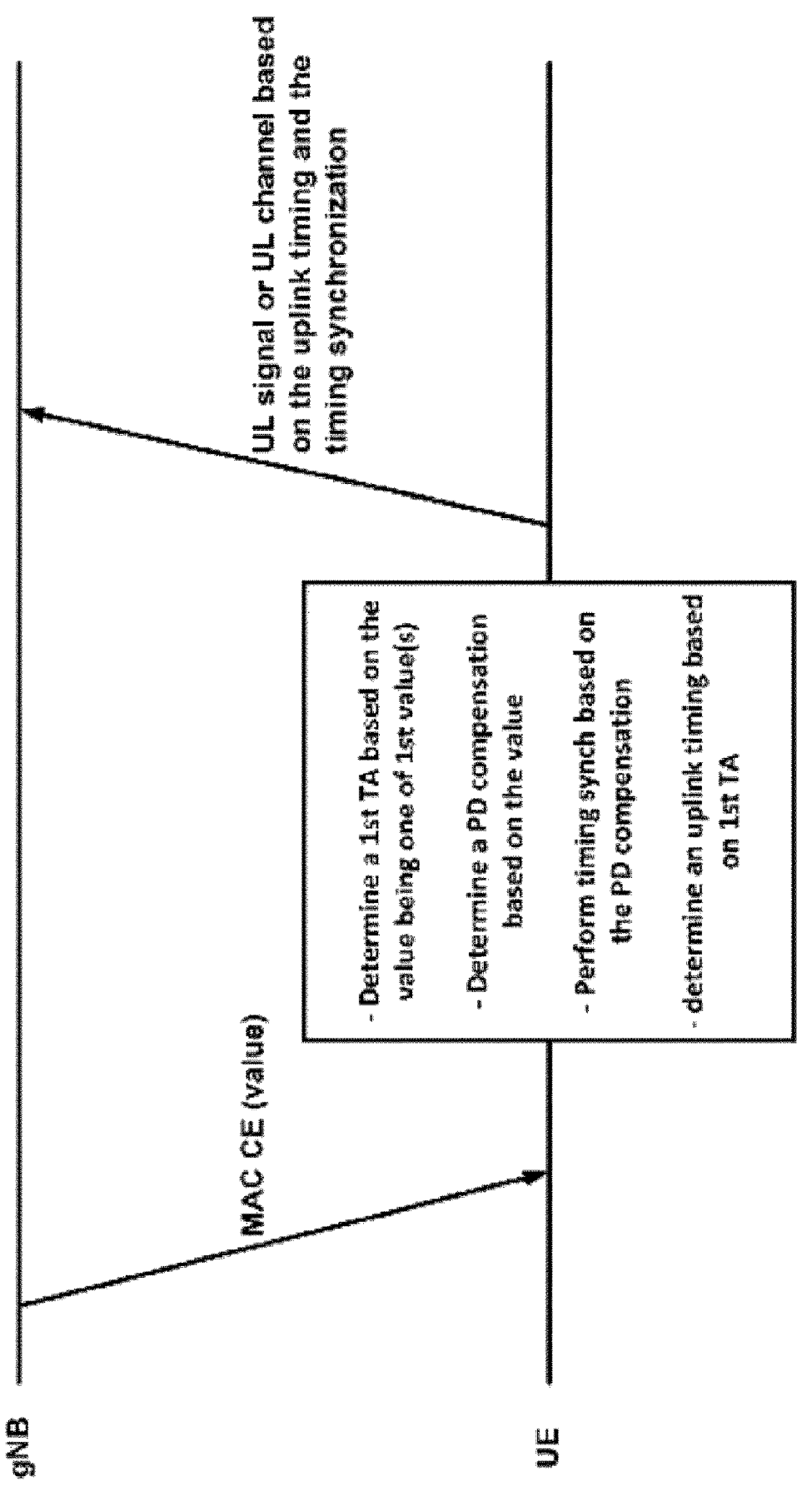
FIG. 17 shows an example process according to some aspects of some of one or more exemplary embodiments of the present disclosure.

In an example embodiment as shown in FIG. 17, a UE may receive one or more messages (e.g., comprising one or more RRC messages) comprising configuration parameters of one or more cells. In some examples, the UE may be characterized as a time sensitive networking (TSN) UE, such as a UE that implements or operates according to one or more TSN applications. In some examples, a specific cell or a specific BWP of a cell configured for the UE may be used for or in conjunction with TSN applications (e.g., may be configured to operate according to TSN applications). In some examples, the configuration parameters of the cell/BWP may comprise a first parameter indicating or defining that the cell/BWP is usable/used for TSN applications. In some examples, a first cell/BWP of the UE may be used for TSN applications and second cell/BWP may be used for non-TSN applications.

The UE may receive MAC CE associated with propagation delay compensation used in timing synchronization. The UE may receive a downlink TB comprising the MAC CE. The UE may determine that the MAC CE is associated with propagation delay compensation based on a logical channel identifier (LCID) corresponding to the MAC CE. For example, a MAC subheader of the TB/MAC PDU comprising the MAC CE may comprise an LCID, corresponding to the MAC CE, and defines or indicates that the MAC CE is associated with propagation delay compensation for timing synchronization. The MAC CE may comprise a field for specifying values utilized in conjunction with aspects of the present application. In some examples, the UE may specify one or more values for propagation delay compensation in the timing synchronization. In some examples, the value may be an enhanced TA value with a fine granularity (e.g., with a finer granularity than a TA MAC CE) for propagation delay compensation.

Figure 18:
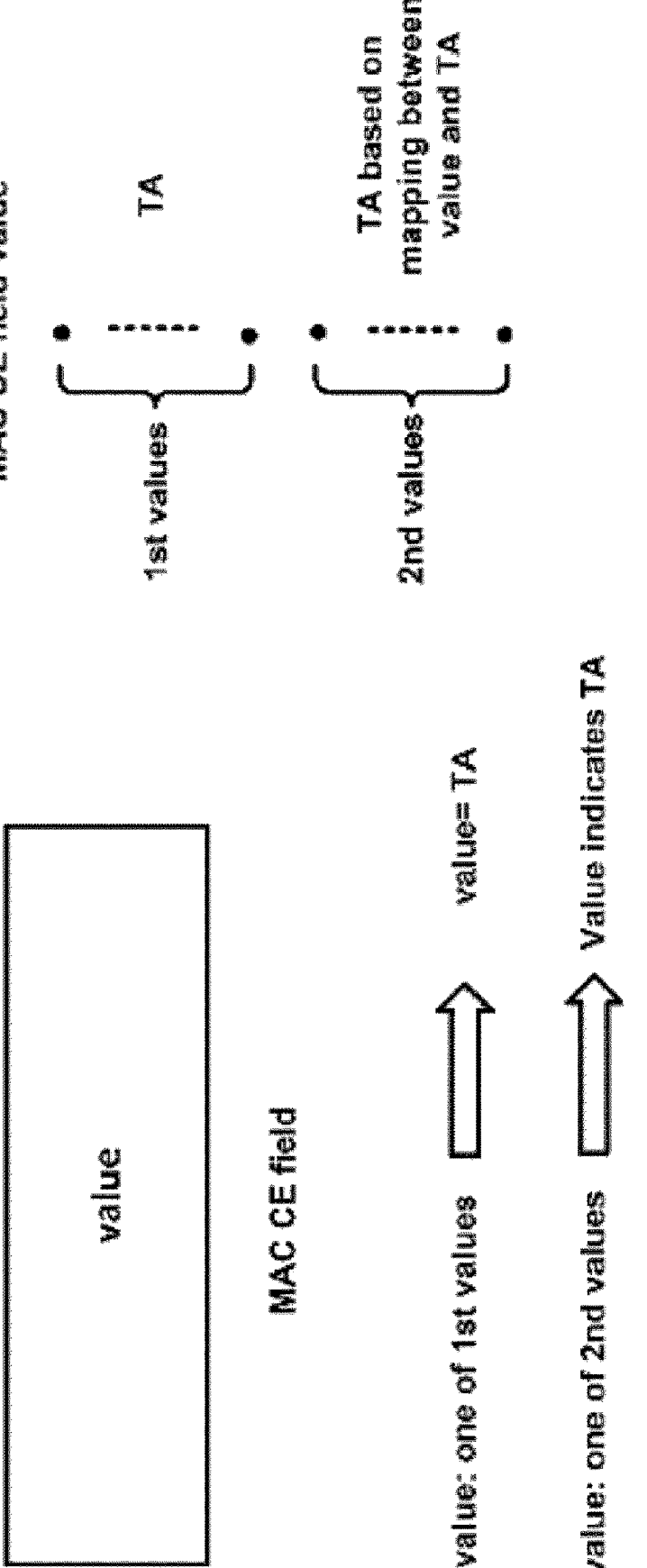
FIG. 18 shows an example process according to some aspects of one or more exemplary embodiments of the present disclosure.

The UE may determine a first TA value based on the value indicated by the MAC CE being one of one or more first values. For example, as shown in FIG. 18, each of the one or more values that may be indicated by the MAC CE may be mapped to a corresponding TA value and the UE may determine the first TA based on the value indicated by the MAC CE being one of the one or more values that are mapped to the first TA. In some examples, as shown in FIG. 18, the UE may determine the first TA as either the value of the MAC CE or the UE may determine the first TA based on the mapping from the value of the MAC CE to the TA. Depending the value of the MAC CE, the value may either equal to the TA or the value may be mapped to a TA based on the mapping. In some examples, the value may be an enhanced TA value with a fine granularity for propagation delay compensation and the UE may determine the first TA with a coarser granularity to be used in a TA procedure and an uplink time alignment process.

In some examples, the mapping between a MAC CE value and a TA value may be semi-statically configured (e.g., according to one or more configuration parameters indicated by one or more RRC messages). In some examples, the one or more configuration parameters may comprise/indicate a first parameter based on which the UE may determine mapping between the one or more values of the MAC CE and a corresponding TA value. In some examples, the mapping between a MAC CE value and a TA value may be pre-configured/pre-determined for the UE.

In some examples, the MAC CE may be used either for determining a TA in a TA procedure or the MAC CE may be used for determining a propagation delay for propagation delay compensation in a timing synchronization process. In some examples, the UE may determine to use the MAC CE for determination of TA only, determination of propagation delay compensation only or for both TA determination and propagation delay compensation based on one or more parameters associated with the MAC CE (e.g., a value of the field of the MAC CE, an LCID associated with the MAC CE, etc.).

The UE may determine a propagation delay based on the value of the MAC CE. The UE may determine a propagation delay compensation to be used in a timing synchronization process. The UE may use the determined propagation delay compensation in a synchronization process and to determine an internal clock for its operation. The UE may apply some weighting factor or adjustment criteria to the determine the PD compensation. In some examples, the UE may apply the weighting factor or adjustment criteria to such that the PD compensation corresponds to a fraction of the PD. Examples include, but are not limited to, any fractional values below one, such as three-fourths, one half, one quarter, and the like. In other examples, the weighting factors or adjustment criteria may be specified as decimal numerals, which may be rounded or estimated to a specified degree of certainty.

The UE may perform a timing synchronization based on the propagation delay compensation. In some examples, the UE may perform the timing synchronization based on the propagation delay compensation and a reference timing. In some examples, the UE may update its received reference timing using the propagation delay compensation. In some examples, the UE may receive the reference timing from the gNB. For example, the UE may receive the reference timing in a broadcast messages (e.g., a SIB message such as SIB9) comprising an information element that defines the reference timing or provides information that allows the reference timing information to be calculated. In some examples, the UE may receive a referenceTimeInfo information element that defines the reference timing. The reference timing may be a grand master clock (e.g., a 5G system grand master clock) in a first 5G system component (e.g., the gNB).

In some example, the UE may transmit a capability message comprising a capability information element that includes information indicating that the UE is capable of, or otherwise configured to implement, propagation delay compensation. The UE may receive one or more configuration parameters that include information indicative that the UE is allowed/enabled for performing propagation delay compensation in response to transmitting the capability message. In some examples, the UE may receive the MAC CE for propagation delay compensation in response to/after transmitting the capability message indicating that the UE is capable of propagation delay compensation. In other examples, the UE may receive the MAC control element for propagation delay compensation responsive to receiving the one or more configuration parameters indicating that the UE is configured to, or otherwise able to implement, propagation delay compensation.

In some examples, the UE may or may not perform the propagation delay compensation in the timing synchronization in response to receiving the propagation delay compensation MAC CE based on the value of the MAC CE or the propagation delay indicated by the MAC CE. For example, the UE may perform the propagation delay compensation for timing synchronization in response to receiving the MAC CE and in response to the propagation delay value indicated by the MAC CE being larger than a threshold. In some examples, the UE may receive a configuration parameter (e.g., in a broadcast message (e.g., a SIB message) or a dedicated RRC message) indicating the threshold.

The UE may determine an uplink timing based on the determined first TA. The UE may update its current uplink timing based on the determined first TA. In some examples, the determined first TA may be for a cell/BWP of a cell. The cell/BWP may correspond to a numerology (e.g., a subcarrier spacing). The determination of the uplink timing may further be based on the numerology of the cell/BWP. The uplink timing may be based on modification of a current uplink timing of the UE. The UE may transmit an uplink signal (e.g., SRS) or an uplink channel (e.g., PUCCH, PUCCH) based on the determined uplink timing and the determined timing synchronization.

Figure 19:
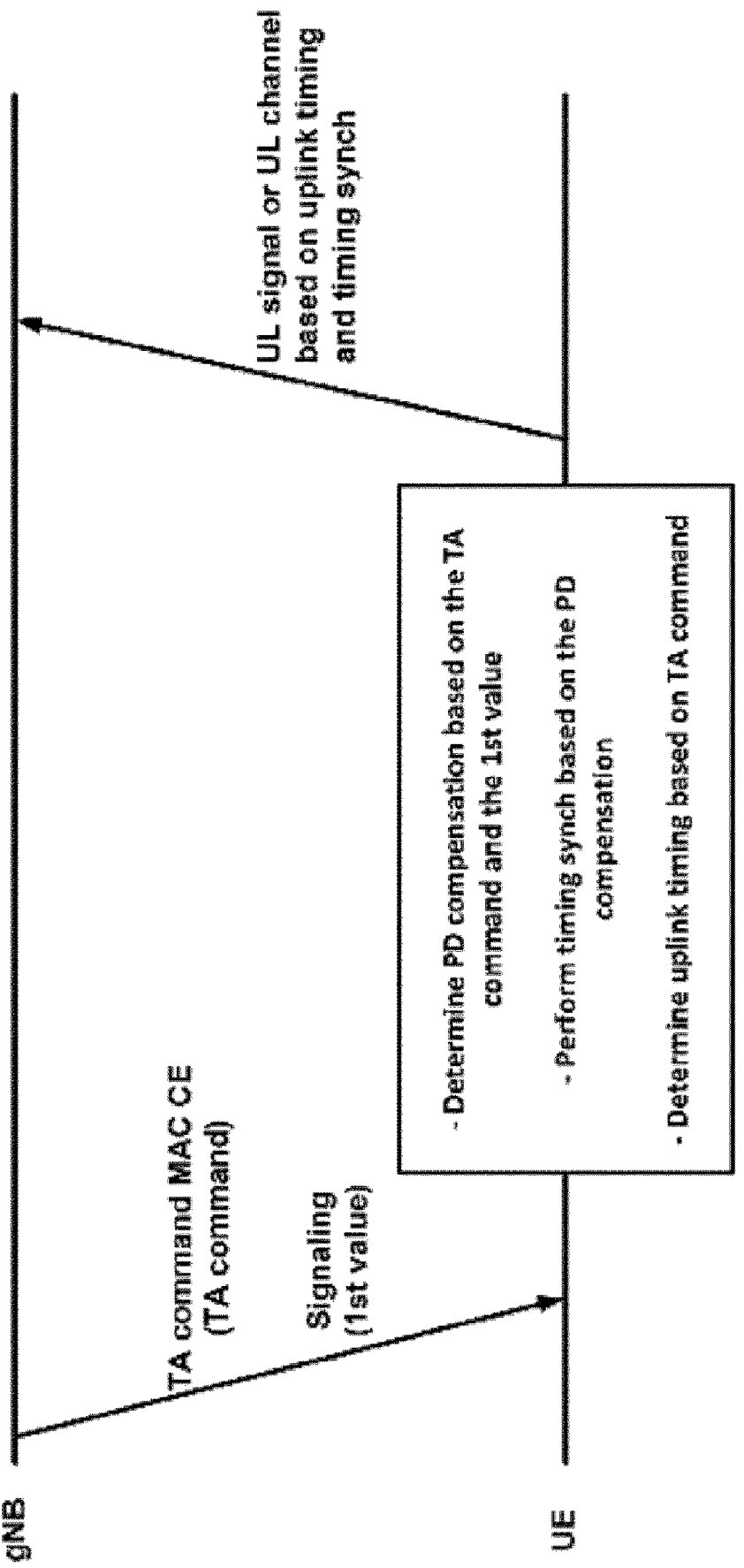
FIG. 19 shows an example process according to some aspects of one or more exemplary embodiments of the present disclosure.

In an example embodiment as shown in FIG. 19, a UE may receive a TA command MAC CE comprising a field with a value indicating a TA command. In some examples, the TA command MAC CE may be an absolute TA command CE. The UE may determine that the received MAC CE is a TA MAC CE based on an LCID, corresponding to the MAC CE, being for a TA command MAC CE. The UE may receive a MAC PDU/TB comprising a subheader that includes a field indicating the LCID associated with the TA command MAC CE. The UE may receive a signaling message comprising a first value associated with a propagation delay that may be used by the UE to determine/estimate a propagation delay compensation for timing synchronization and determining a clock for the UE operation. In some examples, the signaling message may be MAC layer signaling that includes a field having a value utilized for timing synchronization. More specifically, in one embodiment, the MAC layer signaling may illustratively correspond to a second MAC CE that is different from the TA command MAC CE. In case the signaling message is a second MAC CE, the UE may determine that the received second MAC CE is a used for propagation delay estimation/determination/compensation based on the LCID associated with the second MAC CE. For example, the UE may receive a MAC PDU/TB (e.g., the same MAC PDU/TN that comprises the TA command MAC CE or a different MAC PDU/TB) comprising a subheader that includes a field indicating the LCID associated with the TA command MAC CE.

In some examples, the UE may receive one or more configuration parameters (e.g., one or more RRC parameters) and use the one or more configuration parameters for propagation delay estimation/determination/compensation. For example, the one or more configuration parameters may define or indicate one or more adjustments to the TA value defined or indicated by the TA command MAC CE. For example, a value defined in the MAC CE, as defined by the signaling message, may provide an index to a first adjustment of the one or more configured adjustments. The UE may determine the propagation delay and/or the propagation delay compensation based on the TA command and the determined first adjustment from the specified index value. In some examples, the one or more configuration parameters may comprise/indicate a unit of adjustment. The UE may determine the propagation delay/propagation delay compensation based on application of the unit of adjustment to the TA command. For example, in some embodiment, the unit of adjustment is multiplied by an integer indicated by the first value of the signaling message.

In some examples, the determination and compensation of the propagation delay may be based on a predetermined value. For example, the predetermined value may indicate a unit of adjustment and the UE may determine the propagation delay/propagation delay compensation based on the TA command and the unit of adjustment (e.g., the unit of adjustment multiplied by an integer indicated by the first value of the signaling message).

In some examples, based on one or more criteria, the UE may use the TA command, indicated by the TA command MAC CE, only to determine or otherwise estimate a propagation delay value and/or value or propagation delay compensation. In other examples, the UE may use both of the TA command and the first value indicated by the signaling message (e.g., the second MAC CE) to determine or otherwise estimate propagation delay value and/or propagation delay compensation. For example, the one or more criteria may include whether TA command or the TA determined based on the TA command is larger or smaller than a threshold. For example, the UE may use the TA command only to determine or otherwise estimate propagation delay value and/or propagation delay compensation based on the TA command. In other example, the UE may determine the TA based on the TA command being smaller than a threshold. The UE may use both of the TA command and the first value indicated by the signaling message (e.g., the second MAC control element) to determine/estimate PD and/or PD compensation based on the threshold TA command being larger than the threshold. In some example, the UE may receive a configuration parameter (e.g., an RRC parameter) indicating the threshold.

In some example, the UE may transmit a capability message comprising a capability information element indicating that the UE is capable of propagation delay estimation/determination and/or propagation delay compensation. The UE may receive one or more configuration parameters indicating that the UE is allowed/enabled for performing propagation delay compensation in response to transmitting the capability message. In some examples, the UE may determine/estimate propagation delay and/or propagation delay compensation in response to/after receiving the one or more configuration parameters indicating that the UE is allowed/enabled for propagation delay compensation.

Figure 20:
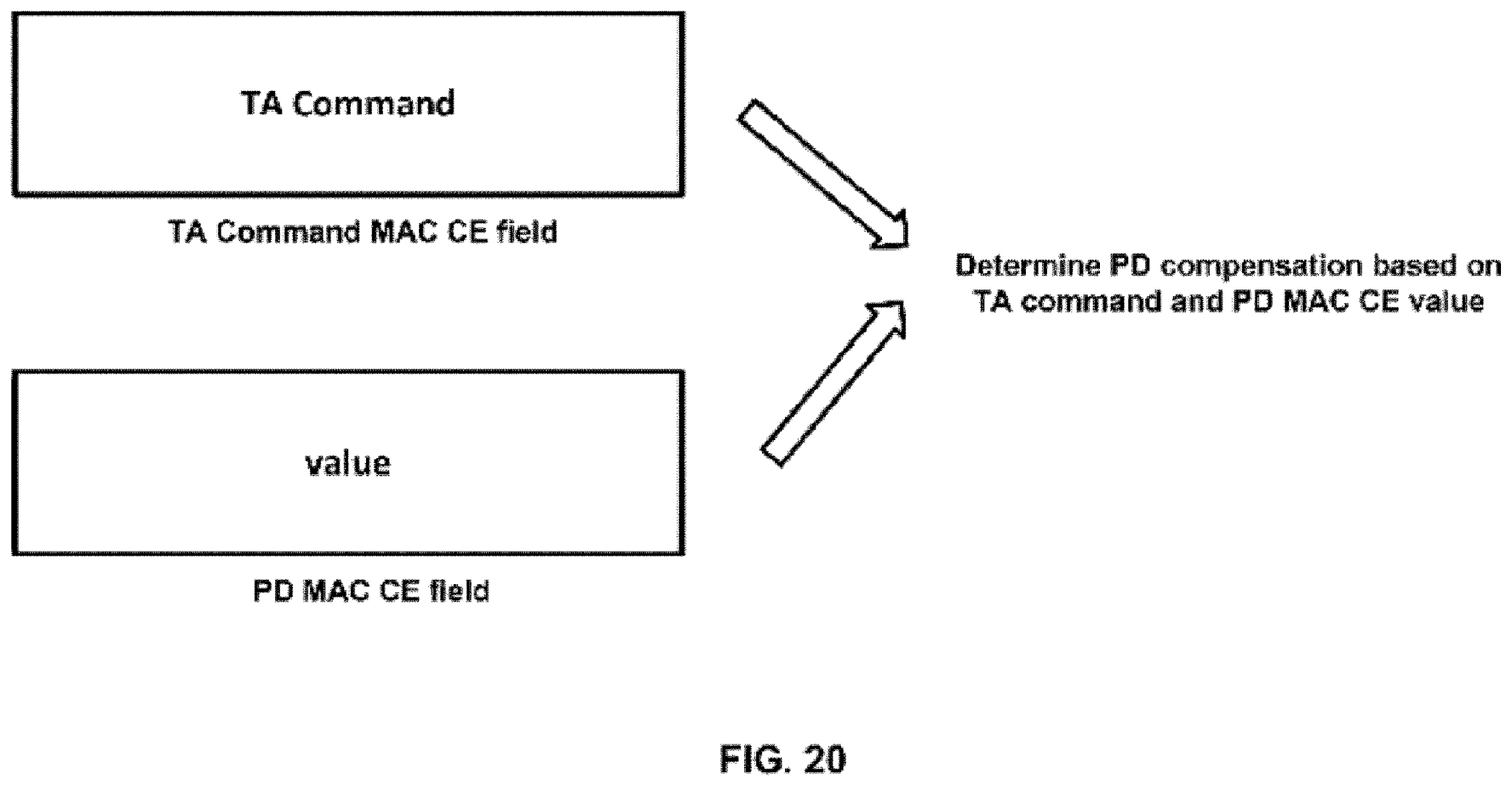

As shown in FIG. 20, the UE may use both the TA command (e.g., indicated by the TA command MAC CE) and the first value of the signaling message to determine the propagation delay compensation. The UE may use the determined propagation delay compensation to perform the timing synchronization. The UE may determine an uplink timing based on the TA command (e.g., indicated by the TA command MAC CE). The UE may transmit an uplink signal (e.g., SRS) or an uplink channel (e.g., PUSCH, PUCCH) based on the determined uplink timing and the determined timing synchronization.

In an example embodiment as shown in FIG. 21, a UE may receive a TA command MAC CE that has one of the first format and the second format. The TA command MAC CE may comprise a TA command. The base station may determine the format of the MAC CE (e.g., the first format or the second format) based on the value of the TA command. For example, the gNB may use the TA command MAC CE with the first format based on the value of the TA command being one of one or more first values and the gNB may use the TA command MAC CE with the second format based on the value of the TA command being one of one or more second values. In some examples, the UE may use the TA command MAC CE for determining an uplink timing for an uplink transmission (e.g., at least one of an uplink signal or an uplink channel) or for propagation delay compensation or for both. In some examples, for some values of the TA command, it may not be necessary for the TA command to have a fine granularity (e.g., the TA command may be transmitted with a comparatively coarser granularity) and for some values of the TA command, the UE may need to have the TA command with high granularity. The requirement on granularity of the TA command may be based on whether the propagation delay estimation/compensation is necessary or not or may depend on the accuracy requirement of the propagation delay compensation. For example, based on the format of the TA command being the second format (e.g., based on the TA command having one or more second values), the UE may determine that the propagation delay compensation is necessary and may perform the propagation delay compensation based on the TA command or the UE may determine that propagation delay compensation with fine propagation delay granularity is required. For example, based on the format of the TA command being the first format (e.g., based on the TA command having one or more first values), the UE may determine that the propagation delay compensation is not necessary and may not perform the propagation delay compensation or the UE may determine that propagation delay compensation with a comparatively coarser granularity is acceptable. In some examples, the UE may perform the timing synchronization based on the propagation delay compensation. In some examples, the UE may further receive a reference timing (e.g., via a broadcast message such as SIB9 or via a dedicated RRC signaling) and the UE may perform a timing synchronization based on the indicated reference timing and the propagation delay compensation.

In some examples, the UE may determine that TA command MAC CE is used for both propagation delay compensation and TA/uplink timing determination or used for TA/uplink timing determination only based on an LCID associated with the TA command MAC CE and/or based on the format of the TA command MAC CE. In some examples, the UE may determine the format of the TA command MAC CE (e.g., the first format or the second format) based on the LCID associated with the MAC CE.

The UE may determine an uplink timing based on the TA command (e.g., indicated by the TA command MAC CE). The UE may transmit an uplink signal (e.g., SRS) or an uplink channel (e.g., PUSCH, PUCCH) based on the determined uplink timing. In some examples, the UE may transmit the uplink timing and the determined timing synchronization.

In an embodiment, a UE may receive a MAC CE comprising a value for calculating a propagation delay compensation. The UE may determine a first TA based on the value matching one of one or more deterministic or defined first values. The UE may determine a propagation delay compensation based on the value. The UE may perform a timing synchronization based on the propagation delay compensation. The UE may determine an uplink timing based on the first TA. The UE may transmit an uplink signal or an uplink channel based on the timing synchronization and the uplink timing.

In some embodiments, determining the first TA may be based on a mapping between values of the MAC CE, for calculating a propagation delay compensation, and TA values. In some embodiments, the UE may receive configuration parameters indicating the mapping. In some embodiments, the configuration parameters may indicate that the one or more first values of the MAC CE are mapped to the first TA. In some embodiments, the mapping may be preconfigured for the UE.

In some embodiments, the MAC CE may be an enhanced TA command MAC CE for indicating a high-granularity TA used for propagation delay compensation. In some embodiments, a logical channel identifier (LCID) associated with the medium access control (MAC) control element (CE) may indicate that the MAC CE is used for propagation delay compensation.

In some embodiments, the propagation delay compensation may be a fraction of a TA indicated by the value. In some embodiments, the propagation delay compensation may be half of a TA indicated by the value.

In some embodiments, the UE may receive a reference timing wherein the timing synchronization may further be based on the reference timing. In some embodiments, the reference timing may be based on a grand master clock. In some embodiments, the reference timing may be indicated by an information element included in a broadcast message. In some embodiments, the broadcast message may be a system information block (SIB). In some embodiments, the reference timing may be indicated by an information element included in a dedicated radio resource control (RRC) message.

In some embodiments, the first TA may be equal to the value based on the value being one of a first plurality of values.

In some embodiments, the timing synchronization may be for a time sensitive networking (TSN) application.

In some embodiments, the UE may receive a configuration parameter that may indicate that propagation delay compensation is enabled for or allowed by the UE.

In some embodiments, the UE may determine, in response to receiving the MAC CE, to perform the timing synchronization based on the propagation delay compensation. In some embodiments, determining to perform the timing synchronization may be based on a propagation delay indicated by the value being larger than a threshold. In some embodiments, the UE may receive a first configuration parameter indicating the threshold.

In some embodiments, transmitting the uplink channel or the uplink signal may be via a cell or a bandwidth part (BWP) of the cell; the cell or the BWP of the cell may be associated with a numerology; and determining the uplink timing may further be based on the numerology.

In some embodiments, the uplink timing may further be based on historical (e.g., an old) uplink timing information. In such examples, the determining of the uplink timing information may be based on the historical uplink timing information.

In an embodiment, a UE may receive a TA command medium access control (MAC) control element (CE) comprising a TA command. The UE may receive a signaling message comprising a first value associated with a propagation delay. The UE may determine a propagation delay compensation based on the TA command and the first value. The UE may perform a timing synchronization based on the propagation delay compensation. The UE may determine an uplink timing based on the TA command. The UE may transmit an uplink signal or an uplink channel based on the timing synchronization and the uplink timing.

In some embodiments, the signaling message may be a second medium access control (MAC) control element (CE) comprising a field with the first value. In some embodiments, the second medium access control (MAC) control element (CE) may be associated with a logical channel identifier (LCID) indicating that the second MAC CE is used for propagation delay compensation.

In some embodiments, determining the propagation delay compensation may further be based on one or more radio resource control (RRC) parameters. In some embodiments, the one or more radio resource control (RRC) parameters may indicate one or more adjustments to a TA value; and the first value may provide an index to a first adjustment in the one or more adjustments. In some embodiments, determining a propagation delay compensation may be based on the TA command and the first adjustment. In some embodiments, the one or more radio resource control (RRC) parameters may indicate an adjustment unit; and the propagation delay compensation may be the adjustment unit multiplied by an integer indicated by the first value.

In some embodiments, determining the propagation delay compensation may further be based on a predetermined value. In some embodiments, the predetermined value may indicate an adjustment unit. In some embodiments, the propagation delay compensation may be the adjustment unit multiplied by an integer indicated by the first value.

In some embodiments, determining the propagation delay compensation may be based on the TA command and the first value in response to the TA command indicating a TA that is larger than a threshold value, otherwise determining the propagation delay compensation may be based only on the TA command. In some embodiments, the UE may receive a configuration parameter indicating the threshold value.

In some embodiments, the UE may receive a configuration parameter indicating that propagation delay compensation is enabled for or allowed by the user equipment (UE).

In some embodiments, the UE may receive a reference timing wherein the timing synchronization may further be based on the reference timing. In some embodiments, the reference timing may be based on a grand master clock. In some embodiments, the reference timing may be indicated by an information element included in a broadcast message. In some embodiments, the broadcast message may be a system information block (SIB). In some embodiments, the reference timing may be indicated by an information element included in a dedicated radio resource control (RRC) message.

In some embodiments, the UE may transmit the uplink channel or the uplink signal via a cell or a bandwidth part (BWP) of the cell. The cell or the BWP of the cell is associated with a numerology. The UE may determine the uplink timing further based on the numerology.

In some embodiments, the uplink timing may further be based on an old uplink timing.

In an embodiment, a user equipment (UE) may receive a TA command medium access control (MAC) control element (CE) with one of a first format or a second format, wherein: the TA command MAC CE may comprise a TA command; the TA command MAC CE may be with a first format based on the timing advance command having one or more first values; and the TA command MAC CE may be with a second format based on the timing advance command having one or more second values. The UE may determine an uplink timing based on the TA command. The UE may transmit an uplink signal or an uplink channel based on the determined uplink timing.

In some embodiment, the UE may determine a propagation delay compensation based on a value of the TA command. In some embodiments, the UE may determine the propagation delay compensation based on the value of the TA command in response to the timing advance command having the one or more second values. In some embodiments, the UE may perform a timing synchronization based on the propagation delay compensation. In some embodiments, a logical channel identifier (LCID) associated with the TA command medium access control (MAC) control element (CE) may indicate whether the TA MAC CE is with the first format or the second format.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

Clause 1. A method of time sensitive networking (TSN) communications, comprising:

receiving, by a user equipment (UE), a medium access control (MAC) control element comprising a value for calculating a propagation delay (PD) compensation;

determining a first timing advance (TA) based on the value matching with one or more first defined values;

determining a PD compensation based on the value;

performing a timing synchronization based on the PD compensation;

determining an uplink timing based on the first TA; and transmitting at least one of an uplink signal or an uplink channel based on the determined timing synchronization and the determined uplink timing.

Clause 2. The method of Clause 1, wherein determining the first TA includes mapping values of the MAC control element.

Clause 3. The method of Clause 2 wherein determining the PD compensation based on the value includes calculating a PD compensation and TA values.

Clause 4. The method of Clause 2 further comprising receiving configuration parameters, wherein the configuration parameter define mapping information.

Clause 5. The method of Clause 4, wherein the configuration parameters include information indicative that the one or more of the first values of the MAC control element are mapped to the first timing advance.

Clause 6. The method of Clause 2, wherein the mapping is preconfigured for the UE.

Clause 7. The method of Clause 1, wherein the MAC control element is an enhanced TA command MAC CE for indicating a high-granularity TA used for PD compensation.

Clause 8. The method of Clause 7, wherein a logical channel identifier (LCID) associated with the MAC control element indicates that the MAC control element is used for PD compensation.

Clause 9. The method of Clause 1, wherein determining the PD compensation includes determining the PD compensation based on application of an adjustment criteria, the adjustment criteria defined in the TA.

Clause 10. The method of Clause 9, wherein the adjustment criteria corresponds to a reduction factor for reducing a value of the TA by one half.

Clause 11. The method of Clause 1 further comprising receiving a reference timing wherein the performing of the timing synchronization is further based on the reference timing.

Clause 12. The method of Clause 11, wherein the received reference timing is based on a grand master clock.

Clause 13. The method of Clause 11 further comprising receiving a broadcast message, wherein the received reference timing is defined by an information element included in the broadcast message.

Clause 14. The method of Clause 13, wherein the broadcast message is a system information block (SIB).

Clause 15. The method of Clause 11 further comprising receiving a dedicated radio resource control message, wherein the reference timing is indicated by an information element included in the RRC message.

Clause 16. The method of Clause 1, wherein the timing synchronization corresponds to a time sensitive networking (TSN) application.

Clause 17. The method of Clause 1 further comprising receiving a configuration parameter, the configuration parameter including information indicating that PD compensation is enabled.

Clause 18. The method of Clause 1 further comprising determining, by the user equipment (UE), in response to receiving the MAC control element, to perform the timing synchronization based on the determined PD compensation.

Clause 19. The method of Clause 18, wherein determining to perform the timing synchronization includes determining to perform timing synchronization based on a determination that a PD value is greater than a threshold.

Clause 20. The method of Clause 18 further comprising receiving a first configuration parameter, wherein the configuration parameter defines the threshold.

Clause 21. The method of Clause 1, wherein transmitting at least one of the uplink signal or the uplink channel includes transmitting via a cell.

Clause 22. The method of Clause 21, wherein transmitting via the cell includes transmitting via a bandwidth part (BWP) of the cell, wherein at least one of the cell or the BWP of the cell is associated with a numerology.

Clause 23. The method of Clause 22, wherein determining the uplink timing based on the numerology.

Clause 24. The method of Clause 1, wherein determining the uplink timing including determining the uplink timing based at least in part on historical uplink timing.

Clause 25. A method of time sensitive networking (TSN) communications, comprising:

receiving, by a user equipment (UE), a timing advance (TA) command MAC control element comprising a TA command;

receiving a signaling message comprising a first value associated with a propagation delay (PD);

determining a PD compensation based on the TA command and the first value associated with the PD;

performing a timing synchronization based on the PD compensation;

determining an uplink timing based on the TA command; and transmitting at least one of an uplink signal or an uplink channel based on the timing synchronization and the determined uplink timing.

Clause 26. The method of Clause 25, wherein the signaling message is a second MAC control element comprising a field with the first value.

Clause 27. The method of Clause 26, wherein the second MAC control element is associated with a logical channel identifier (LCID), and wherein the LCID indicates that the second MAC CE is used for propagation delay compensation.

Clause 28. The method of Clause 25, wherein determining the propagation delay (PD) compensation is further based on one or more radio resource control (RRC) parameters.

Clause 29. The method of Clause 28, wherein:

the one or more radio resource control (RRC) parameters indicate one or more adjustments to a TA value; and the first value provides an index to a first adjustment in the one or more adjustments.

Clause 30. The method of Clause 29, wherein determining the PD compensation is based on the TA command and the first adjustment.

Clause 31. The method of Clause 28, wherein the one or more RRC parameters define an adjustment unit, and wherein determining a PD compensation includes multiplying the adjustment unit by an integer indicated by the first value.

Clause 32. The method of Clause 25, wherein determining the propagation delay (PD) compensation is further based on a predetermined value.

Clause 33. The method of Clause 32, wherein the predetermined value indicates an adjustment unit.

Clause 34. The method of Clause 33, wherein the PD compensation is calculated by multiplying the adjustment unit by an integer indicated by the first value.

Clause 35. The method of Clause 25, wherein determining the PD compensation includes determining the PD compensation based on the TA command and the first value.

Clause 36. The method of Clause 35, wherein determining the PD compensation based on the TA command and the first value includes determining the PD compensation based on the TA command and the first value if the TA command indicates a TA that is larger than a threshold value.

Clause 37. The method of Clause 35, wherein determining the PD compensation based on the TA command and the first value includes determining the PD compensation based on the TA command and the first value if the based only on the TA command where the TA command indicates a TA that is less than or equal to the threshold value.

Clause 38. The method of Clause 35, further comprising receiving a configuration parameter, the configuration parameter defining the threshold value.

Clause 39. The method of Clause 25 further comprising receiving a configuration parameter indicating that PD compensation is enabled for or allowed by the UE.

Clause 40. The method of Clause 25 further comprising receiving a reference timing, wherein the timing synchronization is further based on the reference timing.

Clause 41. The method of Clause 40, wherein the reference timing is based on a grand master clock.

Clause 42. The method of Clause 40 wherein receiving a reference timing includes receiving the reference timing in a broadcast message.

Clause 43. The method of Clause 42, wherein the broadcast message is a system information block (SIB).

Clause 44. The method of Clause 40, wherein receiving a reference timing includes receiving the reference timing in a dedicated radio resource control (RRC) message.

Clause 45. The method of Clause 25, wherein transmitting at least one of the uplink channel or the uplink signal is associated with a numerology and wherein determining the uplink timing includes determining the uplink timing based on the numerology.

Clause 46. A method of wireless communications, comprising:

receiving, by a user equipment (UE), a timing advance (TA) command MAC control element with one of a first format or a second format, wherein:

the TA command MAC CE comprises a TA command;

the TA command MAC CE is formed with a first format where the timing advance command has one or more first values; and the TA command MAC CE is formed with a second format where the timing advance command having one or more second values;

determining an uplink timing based on the TA command; and transmitting at least one of an uplink signal or an uplink channel based on the determined uplink timing.

Clause 47. The method of Clause 46 further comprising determining a propagation delay compensation based on a value of the one or more first or second values.

Clause 48. The method of Clause 47, wherein determining the PD compensation based on the one or more first or second values occurs where the timing advance command embodies the one or more second values.

Clause 49. The method of Clause 47 further comprising performing a timing synchronization based on the PD compensation.

Clause 50. The method of Clause 46, wherein a logical channel identifier (LCID) associated with the timing advance (TA) command MAC control element indicates whether the TA MAC CE is with the first format or the second format.

Clause 51. An apparatus for utilization in wireless communications comprising:

an antenna for use in transmission of electromagnetic signals;

a memory for maintaining computer-readable code; and a processor for executing the computer-readable code that causes the apparatus to:

receive a medium access control (MAC) control element comprising a value for calculating a propagation delay (PD) compensation;

determine a first timing advance (TA) based on matching a value associated with the first TA with one or more first defined values;

determine a PD compensation based on the value;

perform a timing synchronization based on the PD compensation;

determine an uplink timing based on the first TA; and transmit at least one of an uplink signal or an uplink channel based on the determined timing synchronization and the determined uplink timing.

Clause 52. The apparatus of Clause 51, wherein the apparatus determines the first TA by mapping values of the MAC control element.

Clause 53. The apparatus of Clause 52, wherein the apparatus determines the PD compensation based on the value for calculating a PD compensation and TA values.

Clause 54. The apparatus of Clause 52, wherein the apparatus receives configuration parameters, wherein the configuration parameter define mapping information.

Clause 55. The apparatus of Clause 54, wherein the configuration parameters include information indicative that the one or more of the first values of the MAC control element are mapped to the first timing advance.

Clause 56. The apparatus of Clause 52, wherein the mapping is preconfigured for the UE.

Clause 57. The apparatus of Clause 51, wherein the MAC control element is an enhanced TA command MAC CE for indicating a high-granularity TA used for PD compensation.

Clause 58. The apparatus of Clause 57, wherein a logical channel identifier (LCID) associated with the MAC control element indicates that the MAC control element is used for PD compensation.

Clause 59. The apparatus of Clause 51, wherein the apparatus determines the PD compensation by determining the PD compensation based on application of an adjustment criteria, the adjustment criteria defined in the TA.

Clause 60. The apparatus of Clause 59, wherein the adjustment factor corresponds to a reduction factor for reducing a value of the TA by one half.

Clause 61. The apparatus of Clause 51, wherein the apparatus receives a reference timing wherein the performing of the timing synchronization is further based on the reference timing.

Clause 62. The apparatus of Clause 61, wherein the received reference timing is based on a grand master clock.

Clause 63. The apparatus of Clause 61, wherein the apparatus receives a broadcast message, wherein the received reference timing is defined by an information element included in the broadcast message.

Clause 64. The apparatus of Clause 63, wherein the broadcast message is a system information block (SIB).

Clause 65. The apparatus of Clause 61, wherein the apparatus receives a dedicated radio resource control message, wherein the reference timing is indicated by an information element included in the RRC message.

Clause 66. The apparatus of Clause 51, wherein the timing synchronization corresponds to a time sensitive networking (TSN) application.

Clause 67. The apparatus of Clause 51, wherein the apparatus receives a configuration parameter, the configuration parameter including information indicating that PD compensation is enabled.

Clause 68. The apparatus of 51, wherein the apparatus determines in response to receiving the MAC control element, to perform the timing synchronization based on the determined PD compensation.

Clause 69. The apparatus of Clause 68, wherein the apparatus determines to perform the timing synchronization by determining to perform timing synchronization based on a determination that a PD value is greater than a threshold.

Clause 70. The apparatus of Clause 68, wherein the apparatus receives a first configuration parameter, wherein the configuration parameter defines the threshold.

Clause 71. The apparatus of Clause 51, wherein the apparatus transmits at least one of the uplink signal or the uplink channel by transmitting via a cell.

Clause 72. The apparatus of Clause 71, wherein the apparatus transmits via the cell by transmitting via a bandwidth part (BWP) of the cell, wherein at least one of the cell or the BWP of the cell is associated with a numerology.

Clause 73. The apparatus of Clause 72, wherein the apparatus determines the uplink timing based on the numerology.

Clause 74. The apparatus of Clause 51, wherein the apparatus determines the uplink timing based at least in part on historical uplink timing.

This application claims the benefit of U.S. Provisional Application No. 63/104,513, entitled "PROPAGATION DELAY COMPENSATION FOR TIME SENSITIVE NETWORKING," and filed on Oct. 22, 2020. U.S. Provisional Application No. 63/104,513 is incorporated by reference herein.

The invention claimed is:

1. A method for a user equipment (UE) configured to perform time sensitive networking (TSN) communications, the method comprising: receiving, from a base station, a radio resource control (RRC) message including at least reference timing information and one or more configuration parameters indicating whether the UE is enabled or disabled for performing a propagation delay (PD) compensation for a timing synchronization; receiving, from the base station, a timing advance (TA) medium access control (MAC) control element (CE) including a TA command; determining the PD compensation based on the TA command and the one or more configuration parameters; and determining an uplink timing for at least one of an uplink signal or an uplink channel based on the TA command.

2. The method of claim 1, wherein the reference timing information is based on a grand master clock.

3. The method of claim 1, wherein: the RRC message is transmitted via dedicated signaling.

4. The method of claim 1, wherein: the RRC message is a DL information Transfer message used for downlink transfer of Non-access Stratum (NAS) dedicated information.

5. A user equipment (UE) configured to perform time sensitive networking (TSN) communications, the UE comprising: a receiving circuitry configured to: receive, from a base station, a radio resource control (RRC) message including at least reference timing information and one or more configuration parameters indicating whether the UE is enabled or disabled for performing a propagation delay (PD) compensation for a timing synchronization; and receive, from the base station, a timing advance (TA) medium access control (MAC) control element (CE) including a TA command; and a determining circuitry configured to: determine the PD compensation based on the TA command and the one or more configuration parameters; and determine an uplink timing for at least one of an uplink signal or an uplink channel based on the TA command.

6. A method for a base station configured to perform time sensitive networking (TSN) communications, the method comprising: transmitting, to a user equipment (UE), a radio resource control (RRC) message including at least reference timing information and one or more configuration parameters indicating whether the UE is enabled or disabled for performing propagation delay (PD) compensation for a timing synchronization; and transmitting, to the UE, a timing advance (TA) medium access control (MAC) control element (CE) including a TA command, the TA command being used by the UE to determine the PD compensation and an uplink timing for at least one of an uplink signal or an uplink channel.

7. The method of claim 6, wherein: the reference timing information is based on a grand master clock.

8. The method of claim 6, wherein: the RRC message is transmitted via dedicated signaling.

9. The method of claim 6, wherein: the RRC message is a DL information Transfer message used for the downlink transfer of Non-access Stratum (NAS) dedicated information.

10. A base station configured to perform time sensitive networking (TSN) communications, the base station comprising: a transmitting circuitry configured to: transmit, to a user equipment (UE), a radio resource control (RRC) message including at least reference timing information and one or more configuration parameters indicating whether the UE is enabled or disabled for performing propagation delay (PD) compensation for a timing synchronization; and transmit, to the UE, a timing advance (TA) medium access control (MAC) control element (CE) including a TA command, the TA command being used by the UE to determine the PD compensation and an uplink timing for at least one of an uplink signal or an uplink channel.

* * * * *